US012645421B2

(12) United States Patent  
Yao et al.

(10) Patent No.: US 12,645,421 B2  
(45) Date of Patent: Jun. 2, 2026

(54) AUDIO CONVERSION METHOD AND DEVICE

(71) Applicant: AVerMedia TECHNOLOGIES, INC., New Taipei City (TW)

(72) Inventors: Yen-Cheng Yao, New Taipei City (TW); Chia-Jung Hsiao, New Taipei City (TW)

(73) Assignee: AVerMedia TECHNOLOGIES, INC., New Taipei City (TW)

( * ) Notice: Subject to any disclaimer, the term of this patent is extended or adjusted under 35 U.S.C. 154(b) by 260 days.

(21) Appl. No.: 18/670,707

(22) Filed: May 21, 2024

(65) Prior Publication Data

US 2024/0394009 A1 Nov. 28, 2024

(30) Foreign Application Priority Data

May 22, 2023 (TW) ................................. 112118981  
Apr. 1, 2024 (TW) ................................. 113112431

(51) Int. Cl.  
*G06F 3/16* (2006.01)  
*G10L 19/008* (2013.01)

(52) U.S. Cl.  
CPC ............. *G06F 3/162* (2013.01); *G10L 19/008* (2013.01)

(58) Field of Classification Search  
CPC ..... G06F 3/162; G10L 19/008; G10L 19/167; G10L 19/173; G10L 19/0017; H04S 3/008; H03M 7/40  
USPC ........................................................ 700/94  
See application file for complete search history.

(56) References Cited

U.S. PATENT DOCUMENTS

| 2005/0149635 | A1* | 7/2005 | Otsuka ................... | H04N 19/42 |
| | | | | 348/E5.002 |
| 2017/0055005 | A1* | 2/2017 | Nakajima ........ | H04N 21/64322 |
| 2018/0173661 | A1* | 6/2018 | Rand ......................... | H04R 3/12 |
| 2019/0005968 | A1* | 1/2019 | Ichimura .............. | G10L 19/167 |
| 2020/0314539 | A1* | 10/2020 | Borowski .............. | H04N 7/142 |

(Continued)

FOREIGN PATENT DOCUMENTS

| CN | 114783452 | A | * | 7/2022 | ............. | G10L 19/22 |
| KR | 101445620 | B1 | * | 10/2014 | ............. | H04W 8/005 |

*Primary Examiner* — Duc Nguyen  
*Assistant Examiner* — Chimezie Ezeriwe Bekee  
(74) *Attorney, Agent, or Firm* — CKC & Partners Co., LLC

(57) ABSTRACT

An audio conversion method includes steps as follows. An audio conversion device receives an audio, and obtains an audio compression information according to the audio; a host receives the audio compression information, chooses a transmission setting corresponding to the audio conversion device according to the audio compression information, and starts streaming; the audio conversion device performs corresponding encapsulation and transmission on the audio according to the transmission setting; the host receives the audio, and determines whether the audio needs parsing according to the transmission setting or the audio compression information; and the host parses the audio to obtain an audio format information; the host determines that the audio is a compressed audio with data-burst encapsulation according to the audio format information, and then performs data-burst decapsulation on the compressed audio with data-burst encapsulation, to obtain the compressed audio.

20 Claims, 13 Drawing Sheets

(56) References Cited

U.S. PATENT DOCUMENTS

| | | | |
|---|---|---|---|
| 2021/0280199 A1* | 9/2021 | Maniskas | H04N 21/436 |
| 2023/0188919 A1* | 6/2023 | Kim | G06F 3/165 |
| | | | 381/300 |

* cited by examiner

AUDIO CONVERSION METHOD AND DEVICE

RELATED APPLICATION

This application claims priority to Taiwan Patent Application No. 113112431, filed Apr. 1, 2024 and Taiwan Patent Application No. 112118981, filed May 22, 2023, the entirety of which are herein incorporated by reference.

BACKGROUND

Technical Field

The present invention relates to a conversion method and device, and in particular, to an audio conversion method and device.

Description of Related Art

With advances with the audio-visual technique, an increasing number of films or games offer multi-channel output of the video/audio source content, which can be played and heard via surround sound equipment, giving audience or players an immersive and realistic experience.

When a user is experiencing a game (e.g., via a PS5 game machine), there may be a need to capture the game process via an audio capture device, but the audio of the current game is in a multi-channel format of compressed audio.

However, multi-channel decoders are not yet available for current capture devices. If a capture device does not have a decoder for such audio format, multi-channel capture cannot be realized, and it is required to set the output sound format of the game machine as an uncompressed audio, e.g., pulse code modulation (PCM). If the sound that the user wants to capture is a compressed audio (non-PCM format), it was typically decoded into PCM by an internal decoder before transfer; and if there was no decoder for such audio format, capture was impossible. Furthermore, as the compressed audio is decoded internally before transfer, in consideration of compatibility or cost, most of the capture devices use a dual-channel 16-bit PCM sound quality, and the loss of original sound quality cannot be offset, which means a loss of the authentic, multi-channel, high-quality content for the user.

SUMMARY

The present invention provides an audio conversion method and device, to improve the problems of the prior art.

In some embodiments of the present invention, the audio conversion method provided by the present invention includes steps as follows: An audio conversion device receives an audio, and obtains an audio compression information according to the audio; a host receives the audio compression information, chooses a transmission setting corresponding to the audio conversion device according to the audio compression information, and starts streaming; the audio conversion device performs corresponding encapsulation and transmission on the audio according to the transmission setting; the host receives the audio, and determines whether the audio needs parsing according to the transmission setting or the audio compression information; and the host parses the audio to obtain an audio format information; the host determines that the audio is a compressed audio with data-burst encapsulation according to the audio format information, and then performs data-burst decapsulation on the compressed audio with data-burst encapsulation, to obtain the compressed audio.

In some embodiments of the present invention, the audio conversion device provided by the present invention is used with a host, and the audio conversion device includes a receiving module, a processing unit, a control unit and a transfer module. The receiving module is electrically connected to an input interface, the processing unit is electrically connected to the receiving module, the control unit is electrically connected to the processing unit, and the transfer module is electrically connected to the processing unit and the control unit. The input interface receives an audio, the processing unit obtains an audio compression information according to the audio, the control unit controls the transfer module to output the audio compression information to a host such that the host chooses a transmission setting corresponding to the audio conversion device according to the audio compression information and starts streaming, the control unit controls the transfer module to perform corresponding transmission on the audio according to the transmission setting, and if the host obtains an audio format information by parsing the audio, the host determines that the audio is a compressed audio with data-burst encapsulation according to the audio format information, and then performs data-burst decapsulation on the compressed audio with data-burst encapsulation to obtain the compressed audio.

To sum up, the technical solution of the present invention has obvious advantages and beneficial effects compared with prior art. By means of the audio conversion method and audio conversion device of the present invention, a multi-channel compressed audio is obtained from video/audio capture as the compressed audio with data-burst encapsulation is transmitted, such that a user can authentically record the game or the audio-visual experiences.

The above description will be elaborated below with embodiments, and further explanation is provided on the technical solution of the present invention.

BRIEF DESCRIPTION OF THE DRAWINGS

To make the above-mentioned and other purposes, features, advantages and embodiments of the present invention more outstanding and easier to understand, the accompanying drawings are described below.

DETAILED DESCRIPTION

Figure 1:
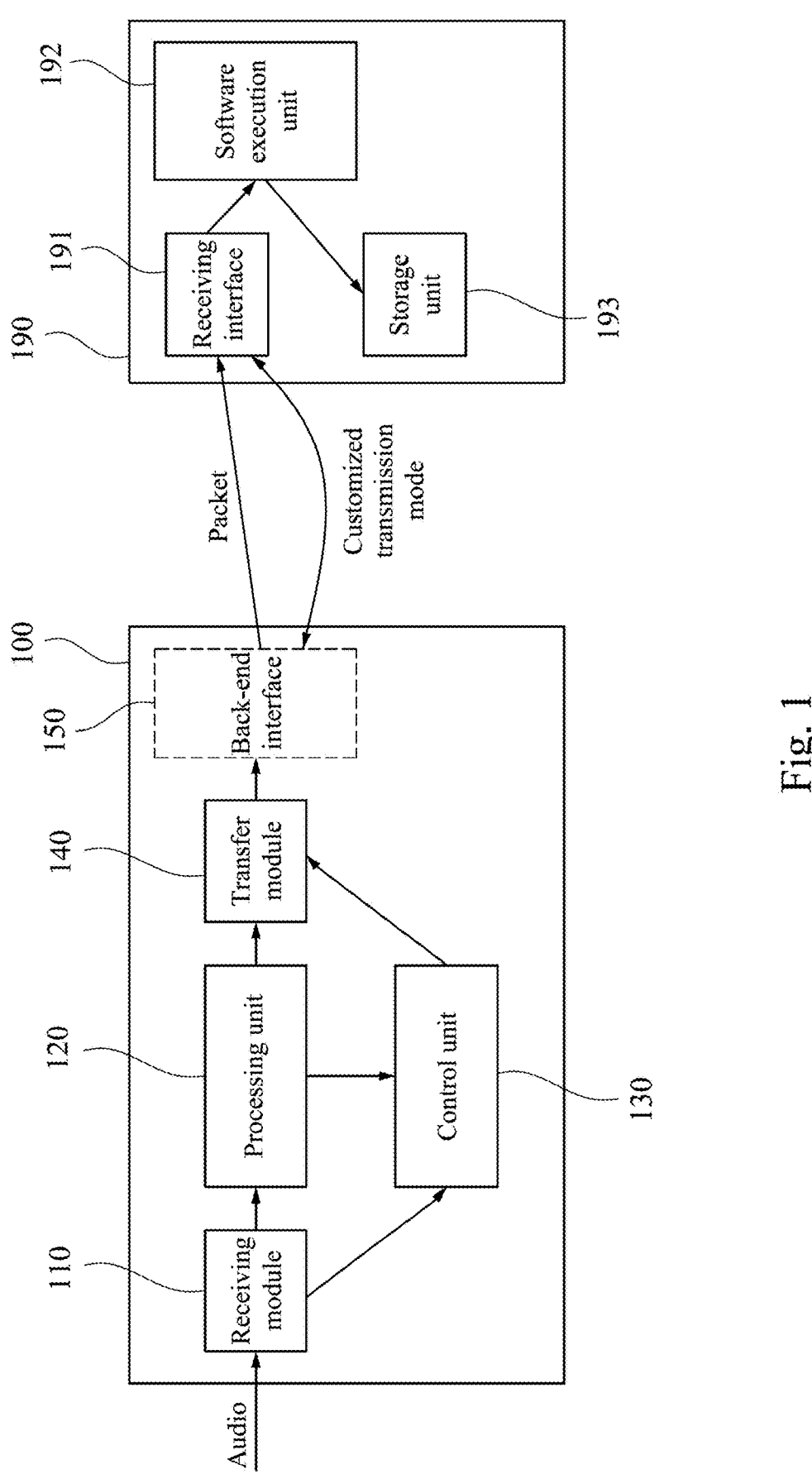
FIG. 1 is a block diagram of an audio conversion device according to some embodiments of the present invention.

For more detailed and complete description of the present invention, reference may be made to the accompanying drawings and the following embodiments, where identical numbers in the drawings represent identical or similar elements. On the other hand, well-known elements and steps are not described in the embodiments, to avoid unnecessary restrictions on the present invention.

FIG. 1 is a block diagram of an audio conversion device 100 according to some embodiments of the present invention. As shown in FIG. 1, the audio conversion device 100 is used with a host 190. In practice, for example, the audio conversion device 100 may be a device for audio conversion only, or for video/audio conversion, such as a mixer, a video/audio capture device, a video/audio capture card, a capture box or other devices, which is not limited here. The host 190 may be a computer, a TV, a speaker, other computational equipment or a combination thereof.

In architecture, the audio conversion device 100 includes a receiving module 110, a processing unit 120, a control unit 130, a transfer module 140 and a back-end interface 150. The back-end interface 150 is electrically connected to the transfer module 140, the transfer module 140 is electrically connected to the processing unit 120 and the control unit 130, the control unit 130 is electrically connected to the processing unit 120 and the receiving module 110, and the processing unit 120 is electrically connected to the receiving module 110.

In addition, the host 190 includes a receiving interface 191, a software execution unit 192 and a storage unit 193. The storage unit 193 is electrically connected to the software execution unit 192, and the software execution unit 192 is electrically connected to the receiving interface 191.

When in use, the receiving module 110 receives an audio, where the audio is a compressed audio, namely, an audio that is compressed. The processing unit 120 determines whether to perform a data-burst encapsulation procedure on the compressed audio according to an encapsulation state of the compressed audio.

If the encapsulation state of the compressed audio is a state without data-burst encapsulation, the processing unit 120 performs data-burst encapsulation on the compressed audio to generate a compressed audio with data-burst encapsulation. Otherwise, if the encapsulation state of the compressed audio is a state with data-burst encapsulation, the processing unit 120 skips the data-burst encapsulation procedure for the compressed audio, that is, the processing unit 120 does not perform the data-burst encapsulation procedure on the compressed audio with data-burst encapsulation.

Then, the control unit 130 controls the transfer module 140 to output the compressed audio with data-burst encapsulation such that the host 190 receives the compressed audio with data-burst encapsulation, and performs a data-burst decapsulation procedure on the compressed audio with data-burst encapsulation to obtain the compressed audio. In some embodiments of the present invention, the host 190 obtains an audio format information of the compressed audio, and performs the data-burst decapsulation procedure on the compressed audio with data-burst encapsulation according to the audio format information.

With respect to the audio format information, the receiving module 110 or the processing unit 120 detects the audio format information of the compressed audio; and if the control unit 130 determines that the audio format information is different from that detected last time, the control unit 130 controls the transfer module 140 to relink.

About the architecture of the audio conversion device 100, in some embodiments, an input interface (not shown) of the audio conversion device 100 may be a high-definition multimedia interface (HDMI), a display port (DP), a SONY/Philips digital interface format (SPDIF), a tuner, Internet, Line in, a 3.5 mm sound-source interface, etc., where the HDMI, DP and SPDIF use a compressed audio with data-burst encapsulation, the Tuner and Internet use a general compressed audio, and the Line in and 3.5 mm sound source interface use an uncompressed audio. In some embodiments, the input interface may be electrically connected to or integrated with the receiving module 110.

In some embodiments, the receiving module 110 receives a video/audio source. The receiving module 110 may be a receiver, such as a video/audio receiver or an audio receiver, e.g., a HDMI receiver, a DP receiver, a SPDIF receiver, a Tuner receiver, an Internet receiver, a Line in receiver, a 3.5 mm receiver, etc. In other embodiments, the receiving module 110 also may be a transceiver. In some embodiments, the receiving module 110 may detect the format of an audio source (e.g., audio).

In some embodiments, the processing unit 120 performs audio encapsulation according to the format of the audio source. The processing unit 120 may be a hardware, a software, or a collocation and combination of software and firmware, e.g., a processor, a microcontroller unit (MCU), a system-on-a-chip (SoC), a field-programmable gate array (FPGA), a sound processing unit, a digital signal processor (DSP), a processing circuit, etc. In some embodiments, the processing unit 120 may detect the format of the audio source.

In some embodiments, the control unit 130 determines a transfer mode according to the detection result of the receiving module 110 and/or the processing unit 120, and sends a command to the transfer module 140. The control unit 130 may be a microcontroller, a system-on-a-chip (SoC) or a control circuit. If the detection result (the format of the audio source) is different from that last time, the control unit 130 sends a command to the transfer module 140 to relink.

The transfer module 140 encapsulates the audio data (e.g., a compressed audio with data-burst encapsulation) into an audio data packet (e.g., a universal serial bus (USB) packet), and then transfers the audio data packet. The transfer module 140 may be, for example, a USB bridge.

In some embodiments, the receiving module 110, the processing unit 120, the control unit 130 and the transfer module 140 may be independent elements (circuits), partially or totally integrated into the same SoC.

About the architecture of the host 190, in some embodiments, the receiving interface 191 may be a digital audio input interface. For example, the USB bridge is used for USB decapsulation and for receiving the audio data and audio format.

In some embodiments, the software execution unit 192 may be a processor or a processing circuit, and the storage unit 193 may be a hard disk, a flash memory or other storage circuits. The software execution unit 192 is used for executing a software stored, e.g., USB audio class driver (UAC driver), a plugin, an application, etc., where the software may be stored in the storage unit 193, or another storage unit, which is not limited here. In some embodiments, the compressed audio may be obtained by executing a single software, e.g., a UAC driver, a plugin or an application, or by executing a plurality of software collocations, e.g., a combination of the above-mentioned UAC driver, plugin, application, etc. For instance, the UAC driver may be used for receiving an audio and detecting the audio format of the audio. If the audio format is one of an uncompressed audio, the storage unit 193 stores the uncompressed audio; otherwise, if the audio format is one of a compressed audio, the plugin performs a data-burst decapsulation procedure on the audio with data-burst encapsulation, to obtain the compressed audio, and the storage unit 193 stores the compressed audio.

In addition, the audio conversion device 100 supports an audio pass-through function, which may transfer an audio from HDMI, DP, SPDIF, Tuner and Internet to an amplifier (not shown) externally connected to the audio conversion device 100 to play. For example, the audio conversion device 100 includes a splitting module. For example, a splitter is connected to the receiving module 110, splits the audio from HDMI, DP, SPDIF, Tuner and Internet, and transfers one part to the amplifier externally connected to the audio conversion device 100.

Figure 2:
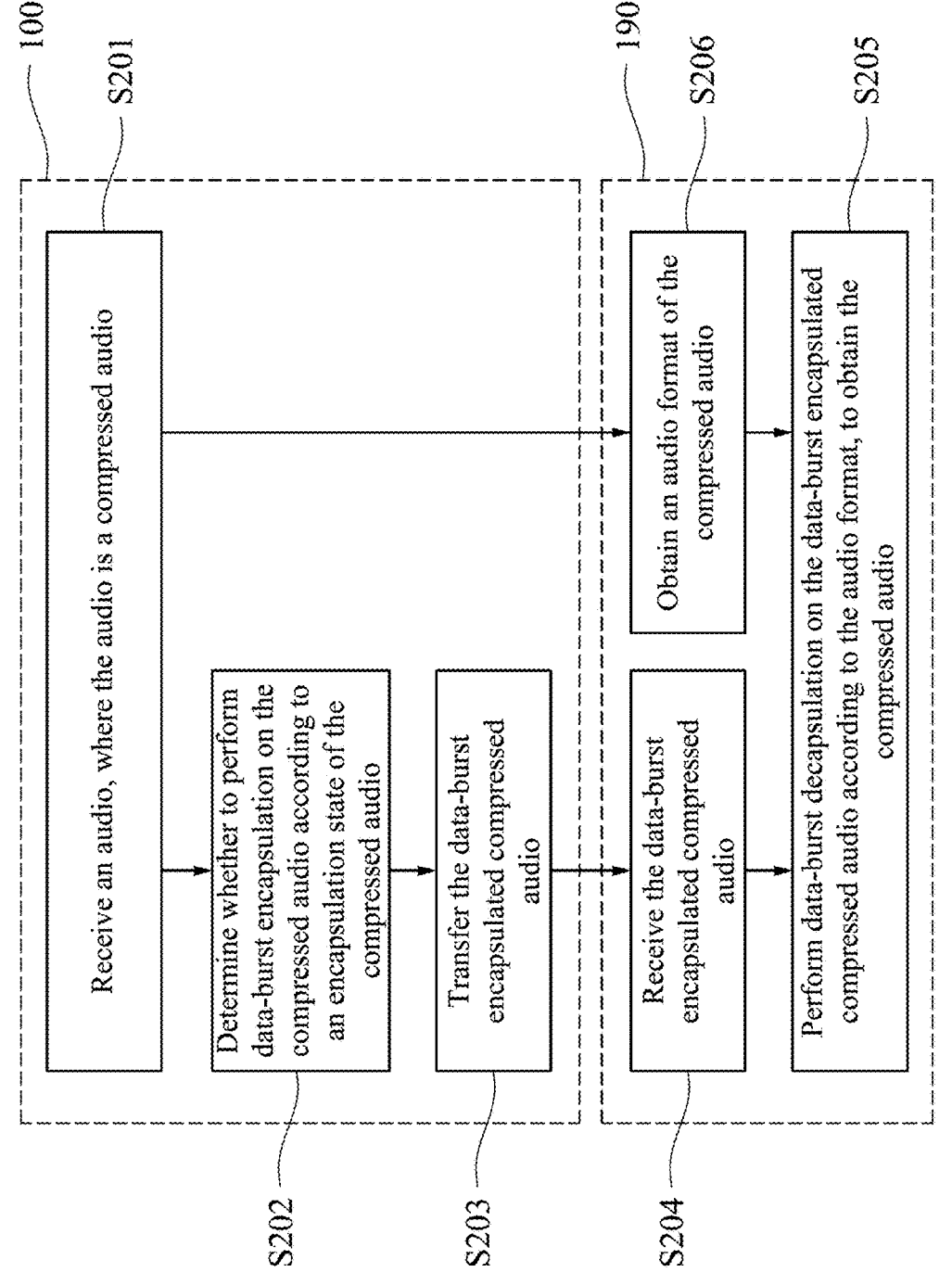
FIG. 2 is a flowchart of an audio conversion method according to some embodiments of the present invention.

To further describe the method of using the audio conversion device 100 with the host 190, please refer to FIGS. 1-2, where FIG. 2 is a flowchart of an audio conversion method 200 according to some embodiments of the present invention. The audio conversion method of this embodiment may be a method for audio conversion only, or for video/ audio conversion, which is not limited here. As shown in FIG. 2, the audio conversion method 200 includes steps S201-S206 (it should be understood that, the steps mentioned in this embodiment, unless with specifically stated order, may all be reordered according to actual needs, or even may be implemented simultaneously or partially simultaneously).

In the step S201, an audio is received via the audio conversion device 100, where the audio may be a compressed audio. In the step S202, it is determined whether to perform a data-burst encapsulation procedure on the compressed audio according to an encapsulation state of the compressed audio. After it is determined whether to perform the data-burst encapsulation procedure on the compressed audio, in the step S203, the compressed audio with data-burst encapsulation is output and transferred to the host 190. In the step S204, the compressed audio with data-burst encapsulation is received via the host 190. In the step S205, the host 190 performs a data-burst decapsulation procedure on the compressed audio with data-burst encapsulation to obtain the compressed audio.

About the step S203, if the encapsulation state of the compressed audio is a state without data-burst encapsulation, the audio conversion device 100 performs data-burst encapsulation on the compressed audio to generate a compressed audio with data-burst encapsulation. Otherwise, if the encapsulation state of the compressed audio is a state with data-burst encapsulation, the data-burst encapsulation procedure is skipped for the compressed audio, that is, the processing unit 120 does not perform the data-burst encapsulation procedure on the compressed audio with data-burst encapsulation.

On the other hand, in the step S206, the host 190 obtains an audio format information of the compressed audio. In some embodiments, the audio conversion device 100 detects the compressed audio to obtain the audio format information, and then the host 190 obtains corresponding audio format information. In some embodiments, prior to the step S206, a first step and a second step may be further included, where the first step is that the audio conversion device 100 obtains the audio format information of the compressed audio, e.g., the compressed audio is detected via the receiving module 110 or the processing unit 120 to obtain the audio format information; and in the second step, the audio conversion device 100 may output the audio format information. In some embodiments, the output audio format information may change according to actual needs. For example, it may be the audio format information per se, or may be integrated with other auxiliary information (e.g., data-burst encapsulation state, transmission mode, channel number and/or sampling rate, etc.), which is not limited here. In this embodiment, in the step S206, the audio format information obtained by the host 190 may be that from the step S2062. In the step S205, the host 190 performs a data-burst decapsulation procedure on the compressed audio with data-burst encapsulation according to the audio format information.

Figure 3:
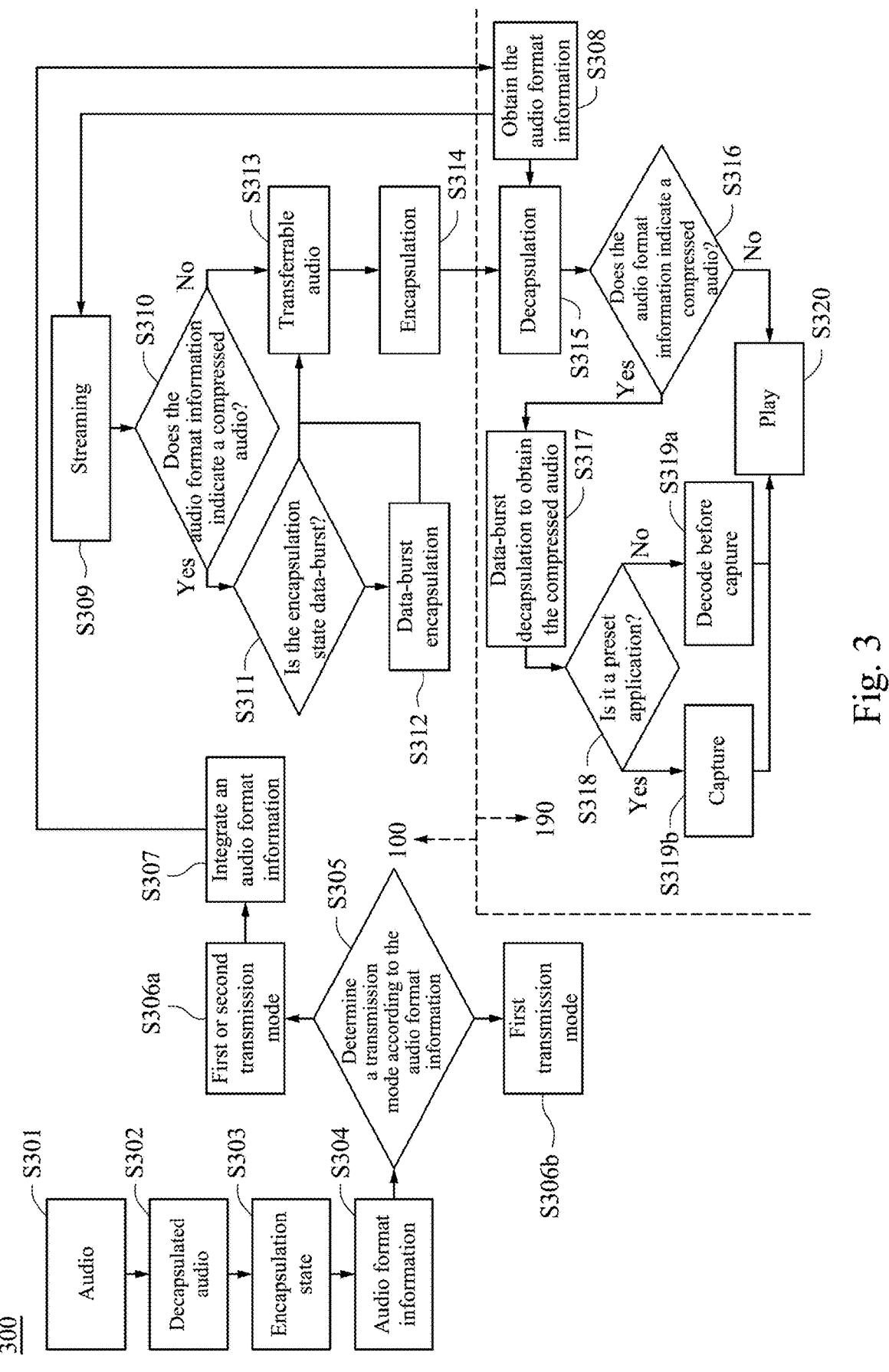
FIG. 3 is a flowchart of an audio conversion method according to some embodiments of the present invention.

Refer to FIGS. 1-3, where FIG. 3 is a flowchart of an audio conversion method 300 according to another embodiment of the present invention. As shown in FIG. 3, the audio conversion method 300 includes steps S301-S320. In FIG. 3, the steps above the dashed line are mostly implemented by the audio conversion device 100, and the steps below the dashed line are mostly implemented by the host 190, which is not limited hereto.

In the step S301, an audio source end outputs an audio to the receiving module 110. The receiving module 110 receives the audio via an input interface (HDMI, DP, SPDIF, Tuner, Internet, Line in, 3.5 mm, etc.).

In the step S302, the receiving module 110 performs decapsulation (e.g., IEC60958 or ISO/IEC13818) in a manner according to different input interfaces, to obtain a decapsulated audio. For example, if the input interface is a HDMI interface, the receiving module 110 removes HDMI encapsulation (e.g., IEC60958) to obtain the decapsulated audio. In some embodiments, after the audio conversion device 100 receives a power supply (from the host 190 or a power converter), the steps S301 and S302 are initiated. In some embodiments, the audio conversion device 100 includes a splitting module. For example, a splitter is used for splitting the received audio to other elements or devices.

In the step S303, the receiving module 110 transfers the decapsulated audio to the processing unit 120. The processing unit 120 receives the decapsulated audio and parses the same to obtain an encapsulation state of the decapsulated audio. For instance, the encapsulation state of PCM dual-channel is a raw state, and the encapsulation state of Dolby digital 5.1 channel is IEC61937_AC-3_DataBurst.

In the step S304, the control unit 130 obtains an audio format information (of the compressed audio). For instance, the compressed audio may be detected via the receiving module 110 or the processing unit 120 to obtain the audio format information, e.g., the receiving module 110 or the processing unit 120 obtains the audio format information by parsing the decapsulated audio, and transfers the same to the control unit 130. Where the audio format is, for example, PCM, AC-3 (Dolby digit), EAC-3 (Dolby digit+), MPEG audio (Layer I II III IV (AAC)), DTS, WMA, ATRAC, MAT and DRA; and the audio format information may be one of the header information of the audio content, for specifying the audio format of the audio.

In the step S305, a transmission mode is determined according to the audio format information. The control unit 130 obtains the audio format information, and determines the transmission mode according to the audio format information. In some embodiments, the control unit 130 determines that the audio format information is a first audio class (uncompressed audio) or a second audio class (compressed audio), chooses a first transmission mode or a second transmission mode according to the first audio class (uncompressed audio) or the second audio class (compressed audio), and informs the transfer module 140 (e.g., USB module for USB packet conversion and transfer) to use corresponding mode for transmission. The first transmission mode is USB audio class audio data format type I (UAC Type I), and the second transmission mode is USB audio class audio data format type III (UAC Type III).

In the step S306b, if the audio format information indicates an uncompressed audio, the control unit 130 informs the transfer module 140 to set the transmission mode as the first transmission mode, and uses a first transmission packet (e.g., UAC Type I transmission packet).

In the step S306a, if the audio format information indicates a compressed audio, the control unit 130 informs the transfer module 140 to set the transmission mode as the first transmission mode, and uses the first transmission mode (e.g., UAC Type I transmission packet) for transmission. Or the transmission mode is set to the second transmission mode, and a second transmission packet (e.g., UAC Type III transmission packet) is used. In some embodiments, if the audio format information indicates a compressed audio, the control unit 130 presets the use of the first transmission mode or the second transmission mode, and informs the transfer module to set the transmission mode as the first transmission mode or the second transmission mode.

In some embodiments, if the control unit 130 determines that there is a change in the transmission mode, audio format information or channel number information, the transfer module 140 needs to modify a descriptor (e.g., the modification may be made when a change occurs, or each time when detection is performed), and to relink. For instance, this time, the transmission mode of a descriptor 1 is FORMAT_TYPE_I, the audio format information is PCM, and the channel number is 2, while last time, the transmission mode of a descriptor 2 is FORMAT_TYPE_III, and the audio format information is IEC61937_AC-3, indicating a change in the descriptor. So, the control unit 130 controls the transfer module 140 to relink for choosing another transmission mode, to avoid errors.

In the step S307, the control unit 130 outputs corresponding audio format information to the host 190 according to the audio format information of the above-mentioned steps. In this embodiment, the output audio format information may change according to actual needs. For example, it may be the audio format information per se, or may be integrated with other auxiliary information (e.g., data-burst encapsulation state, transmission mode, channel number and/or sampling rate, etc.), which is not limited here. For instance, the audio format information of PCM dual-channel is PCM, its transmission mode is Type I (format: PCM), and the integrated audio format information is PCM; and the audio format information of Dolby digit 5.1 channel is AC-3, its transmission mode is Type III (format: IEC61937_AC-3), and the integrated audio format information may be defined according to the Dolby audio format, and the state with data-burst encapsulation and the transmission mode may be IEC61937_AC-3_DataBurst. In some embodiments, the step S307 may be omitted.

In the step S308, the host 190 obtains an audio format information (of the compressed audio). In an embodiment, the host 190 may use a customized transmission mode to obtain the audio format information (from the step S307) from the audio conversion device 100 (compressed audio), that is, the audio conversion device 100 may use the customized transmission mode to transfer the audio format information to the host 190. For instance, the customized transmission mode may be, for example, USB extension command (USB extension cmd), human interface device report (HID report), etc. With the audio format information, transmission is established between the back-end interface 150 (e.g., USB interface) of the audio conversion device 100 and the receiving interface 191 (USB interface) of the host 190.

In the step S309, a software starting unit 192 of the host 190 starts the audio conversion device 100 for streaming.

In the step S310, it is determined whether the audio format information indicates a compressed audio.

In the step S313, the control unit 130 of the audio conversion device 100 sets the processing unit 120 according to the audio format information and the encapsulation state, which performs processing to obtain a transferrable audio. If the audio format information indicates an uncompressed audio, the control unit 130 transfers the setting of the host 190 to the processing unit 120, to obtain the transferrable audio. Where the transferrable audio has a format conforming to that of an uncompressed audio.

In the step S311, if the audio format information indicates a compressed audio, the control unit 130 controls the processing unit 120 according to the audio format information and the encapsulation state to perform data-burst encapsulation.

In the step S312, if the encapsulation state is a state without data-burst encapsulation, the compressed audio needs data-burst (e.g., IEC61937 Data-Burst format) encapsulation, such that the compressed audio is encapsulated into a data-burst packet (compressed audio with data-burst encapsulation), to obtain the transferrable audio.

If the encapsulation state is a state with data-burst encapsulation, the compressed audio is a data-burst packet, and the transferrable audio is obtained directly without encapsulation.

In the step S314, an audio transfer packet is generated. In this embodiment, the transfer module 140 generates from a transferrable audio an audio transfer packet corresponding to a back-end interface. For instance, the transfer module 140 receives the transferrable audio from the processing unit 120, generates from the transferrable audio an audio transfer packet corresponding to the back-end interface 150, e.g., performing USB encapsulation to obtain an USB-encapsulated audio. The USB-encapsulated audio is transferred to the host 190.

In the step S315, the host 190 receives the USB-encapsulated audio, and removes the USB encapsulation, to obtain the transferrable audio. For instance, the USB encapsulation may be removed on the receiving interface 191 (e.g., USB Bridge), to obtain the transferrable audio. In other embodiments, the host 190 may remove the USB encapsulation by processing at different positions according to actual conditions.

The host 190 performs decapsulation on the transferrable audio, to obtain the compressed audio. The software, e.g., a plugin (like an uncompressed audio support package), executed by the software execution unit 192, will restore the transferrable audio received by a driver (e.g., UAC driver) with the following steps, to obtain an original audio.

The driver obtains the following information in the step S308: reading the transmission mode from a UAC descriptor, obtaining the audio format information via a customized transmission mode (e.g., USB extension cmd, HID report, etc.). The plugin performs processing according to a different audio format information, to obtain the original audio.

In the step S316, the plugin inquires whether the audio format information indicates a compressed audio. If the audio format information indicates an uncompressed audio, it does not need processing, and the transferrable audio is the original audio, e.g., PCM.

In the step S320, after the restoration of the original audio, an application (e.g., a media player, a video/audio editing software, etc.) may perform capture, streaming, and/or follow-up play.

In the step S317, if the audio format information indicates a compressed audio, the transferrable audio is delivered to the plugin, and the plugin performs data-burst decapsulation (e.g., IEC61937 data-burst format) in corresponding manner according to the audio format information, to obtain the compressed audio. The plugin will reprocess the compressed audio according to other follow-up functional application (e.g., live streaming, video/audio editing, etc.).

In the step S318, it is determined whether the other follow-up functional application is a preset application (e.g., self-developed application).

If the other follow-up functional application is a third-party application, in the step S319a, since the third-party application cannot get the audio format information, the plugin will use a corresponding audio decoder according to the audio format information to decode the compressed audio before transferring the same to the back end for capture, and streaming/or play.

If the other follow-up functional application is a preset application (e.g., self-developed application), in the step S319b, the self-developed application may obtain the audio format information via a customized transmission mode (e.g., USB extension cmd, HID report, etc.), and may use the same to perform the capture or post-processing (decoding and then recoding) and follow-up play of the compressed audio. Meanwhile, the plugin is informed that there is no need for reprocessing.

In some embodiments, the audio conversion device 100 includes an input monitoring unit (e.g., input monitoring circuit), for monitoring whether an input audio is abnormal. When the audio changes, it is required to re-detect the audio format, back to the steps S303 and S304.

To sum up, in the audio conversion method 300, the format of the compressed audio with data-burst encapsulation conforms to that of an uncompressed audio, thus, the first transmission mode (UAC Type I) may be preset for the compressed audio, or the second transmission mode (UAC Type III) may be preset for the compressed audio, to realize a diversified transmission mode for the compressed audio via the USB interface.

Figure 4:
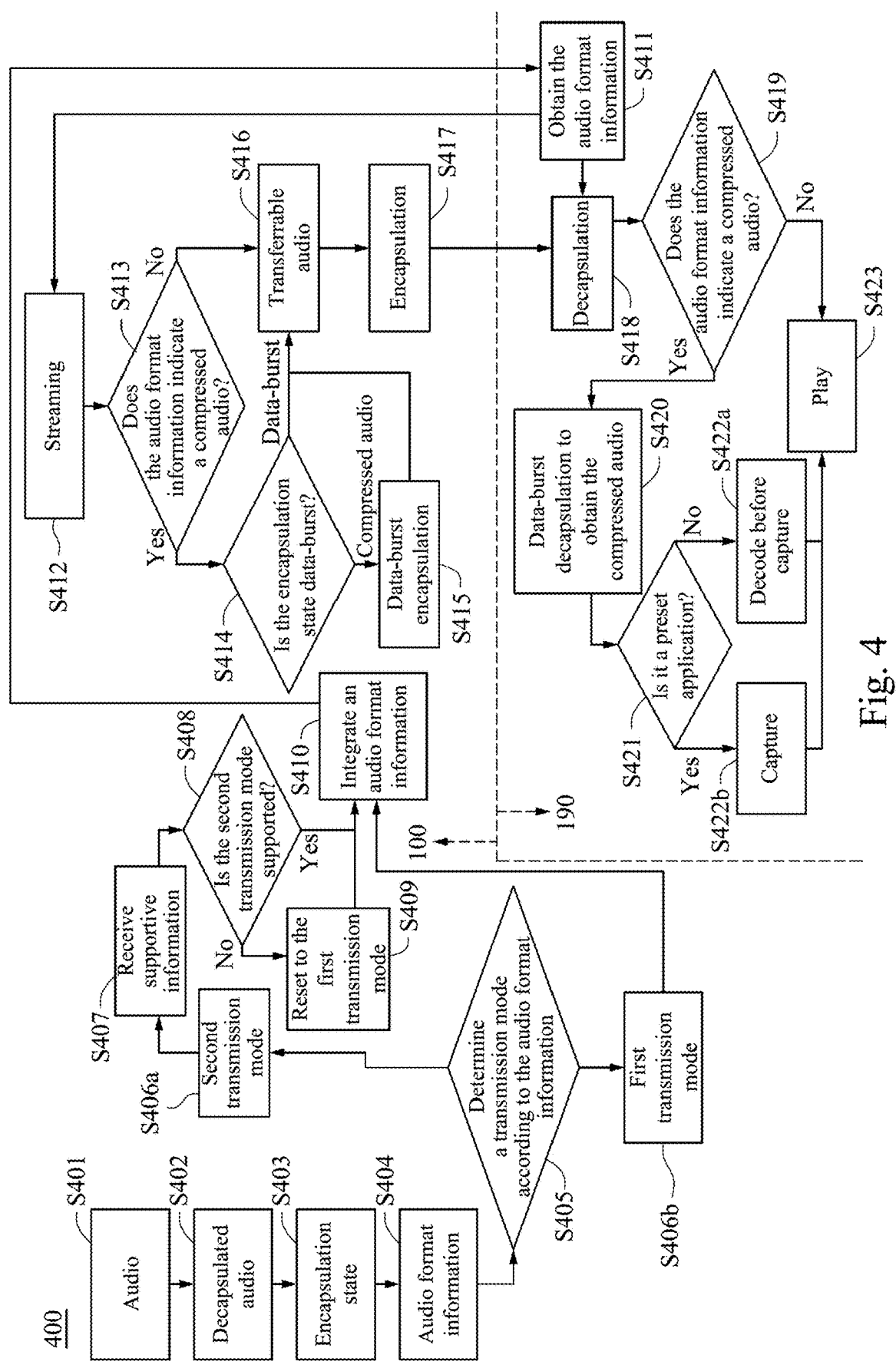
FIG. 4 is a flowchart of an audio conversion method according to some embodiments of the present invention.

Refer to FIGS. 1-4, where FIG. 4 is a flowchart of an audio conversion method 400 according to still another embodiment of the present invention. As shown in FIG. 4, the audio conversion method 400 includes steps S401-S423. In FIG. 4, the steps above the dashed line are mostly implemented by the audio conversion device 100, and the steps below the dashed line are mostly implemented by the host 190, which is not limited hereto.

The steps S401-S405 and S406b in FIG. 4 are substantially identical to the steps S301-S305 and S306b in FIG. 3, which thus are not repeated.

In the step S406a, the transfer module 140 uses the second transmission mode (UAC Type III). In some embodiments, the step S406a may be omitted.

In the step S407, the audio conversion device 100 receives a supportive information from the host 190. For instance, the software (e.g., plugin) installed on the host 190 is in charge of analyzing and determining whether the system to which the software is installed is able to support a second transmission mode (UAC Type III) packet. After the host 190 recognizes the audio conversion device 100, it informs the audio conversion device 100, in a customized transmission mode (e.g., USB extension cmd, HID report, etc.), about the information of the analysis result on whether the second transmission mode (UAC Type III) packet is supported. The audio conversion device 100 receives the supportive information from the host 190, e.g., about supporting the second transmission mode (UAC Type III).

In the step S408, the control unit 130 performs different processing according to the information on whether to support the second transmission mode (UAC Type III) packet.

If the second transmission mode (UAC Type III) is supported, the control unit 130 informs the transfer module 140 to set the transmission mode as the second transmission mode (e.g., transmission of UAC Type IIII packet).

If the second transmission mode (UAC Type III) is not supported, in the step S409, the control unit 130 informs the transfer module 140 to set the transmission mode as the first transmission mode (e.g., transmission of UAC Type I packet).

In the step S410, the control unit 130 integrates an audio format information according to the received audio format information and the information on whether the second transmission mode packet is supported, and may transfer the same to the host 190 in a customized transmission mode (e.g., USB extension cmd, HID report, etc.). In some embodiments, the output audio format information may change according to actual needs. For example, it may be the audio format information per se, or may be integrated with other auxiliary information (e.g., data-burst encapsulation state, transmission mode, channel number and/or sampling rate, etc.), which is not limited here.

For instance, the audio format information of PCM dual-channel is PCM. No matter whether it is the information that supports the second transmission mode (UAC Type III), the transmission mode is set to the first transmission mode (UAC Type I (format: PCM)), and the integrated audio format information is PCM.

For instance, the audio format information of Dolby digit 5.1 channel is AC-3 which does not support the second transmission mode (UAC Type III), the transmission mode is set to the first transmission mode (UAC Type I (format: PCM)), and the integrated audio format information may be defined according to the Dolby audio format while the state with data-burst encapsulation and the transmission mode may be IEC61937_AC-3_DataBurst.

For instance, the audio format information of Dolby digit 5.1 channel is AC-3 which supports the second transmission mode (UAC Type III), the transmission mode is set to the second transmission mode (Type III (format: IEC61937_AC-3)), and the integrated audio format information may be defined according to the Dolby audio format while the state with data-burst encapsulation and the transmission mode may be IEC61937_AC-3_DataBurst.

The steps S411-S423 in FIG. 4 are substantially identical to the steps S308-S320 in FIG. 3, which thus are not repeated.

To sum up, in the audio conversion method 400, the first transmission mode (UAC Type I) is preset for the uncompressed audio, and the second transmission mode (UAC Type III) is preset for the compressed audio is preset, such that different audios are transmitted in different modes, thereby improving the transmission stability. Furthermore, since the format of the compressed audio with data-burst encapsulation conforms to that of an uncompressed audio, the compressed audio may flexibly choose the first transmission mode (UAC Type I) or the second transmission mode (UAC Type III) according to whether the host 190 supports the second transmission mode, to realize a diversified transmission mode for the compressed audio via the USB interface.

In practice, if the captured video/audio content highlights immediacy, the audio conversion device 100 may split the audio and enable the audio to pass through, to output multi-channel, high-quality content to an amplifier or a monitor/TV, where the amplifier may be electrically connected between the audio conversion device 100 and the monitor/TV, or the monitor/TV may be electrically connected between the audio conversion device 100 and the amplifier.

In practice, if the captured video/audio content highlights operations on the host 190 (e.g., interaction with the audience in live streaming), multi-channel, high-quality content may be output via the HDMI of the host 190, and output to an amplifier or a monitor/TV, where the amplifier may be electrically connected between the host 190 and the monitor/TV, or the monitor/TV may be electrically connected between the host 190 and the amplifier.

Figure 5:
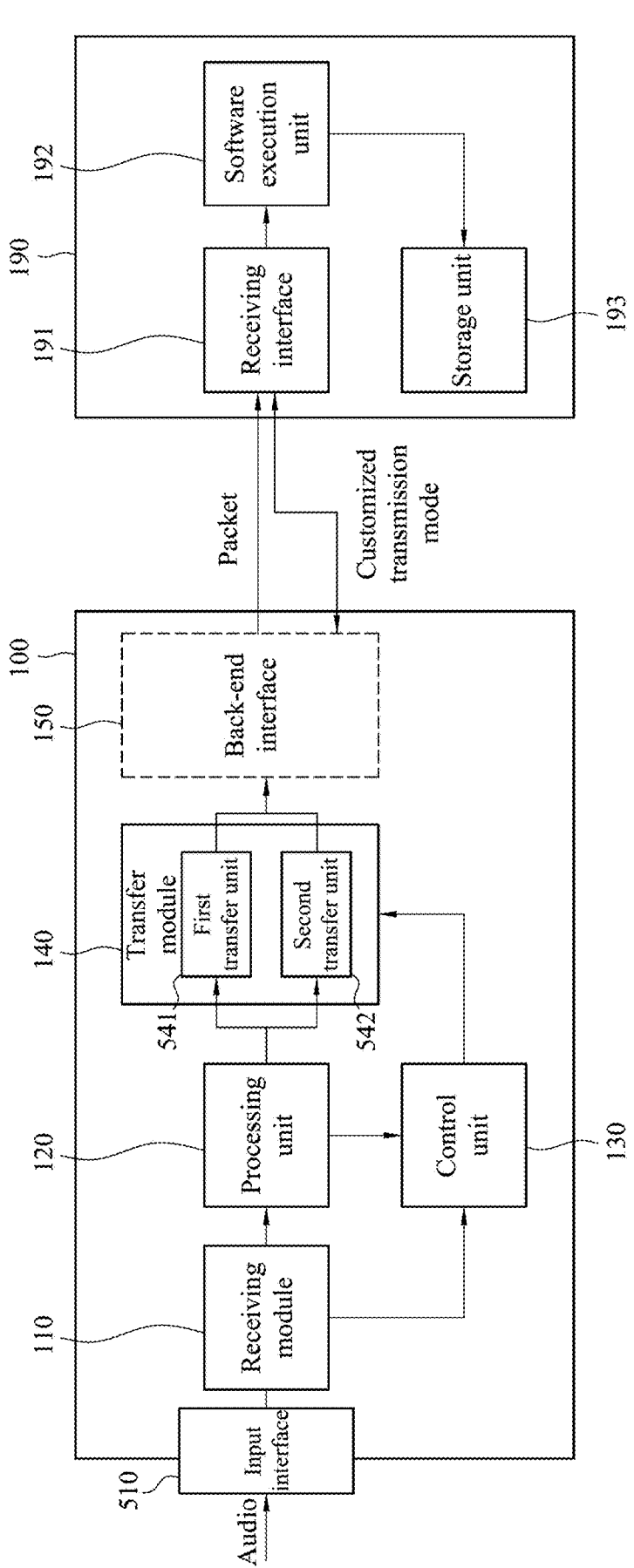
FIG. 5 is a block diagram of an audio conversion device according to some embodiments of the present invention.

FIG. 5 is a block diagram of an audio conversion device 100 according to some embodiments of the present invention. Compared with FIG. 1, the audio conversion device 100 of FIG. 5 further includes an input interface 510, where, in architecture, the input interface 510 is electrically connected to the receiving module 110. In practice, for instance, the input interface 510 may be an interface supporting IEC60958 or IEC61937 encapsulation transmission, such as a high-definition multimedia interface (HDMI), a display port (DP) and a SONY/Philips digital interface format (SPDIF).

When in use, the input interface 510 receives an audio, the receiving module 110 obtains an audio compression information according to the audio, the control unit 130 controls the transfer module 140 to output the audio compression information to the host 190 such that the host 190 chooses a transmission setting corresponding to the audio conversion device 100 according to the audio compression information and starts streaming, and the control unit 130 controls the transfer module 140 to perform corresponding transmission on the audio according to the transmission setting. If the host 190 obtains an audio format information by parsing the audio, the host 190 determines that the audio is a compressed audio with data-burst encapsulation according to the audio format information, and then performs data-burst decapsulation on the compressed audio with data-burst encapsulation to obtain the compressed audio.

In some embodiments, the audio conversion device 100 supports an audio pass-through function, which transfers the audio from the input interface 510 to the amplifier externally connected to the audio conversion device 100 to play. For example, the audio conversion device 100 includes a splitting module. For example, a splitter is connected to the receiving module 110. After the audio conversion device 100 receives an audio (e.g., audio streaming data), and the audio is split into two parts by the splitter, a user may transfer one part of the audio to the amplifier, enjoying high-quality music without delay; and the other part is transmitted to the host 190 via the back-end interface 150 of the device, for recording or post-processing (e.g., decoding and then recoding).

In addition, the transfer module 140 of FIG. 5 further includes a first transfer unit 541 and a second transfer unit 542. In practice, for instance, the transfer module 140 is a USB bridge, the first transfer unit 541 is one endpoint of the USB bridge, and the second transfer unit 542 is the other endpoint of the USB bridge. The back-end interface 150 may be a USB interface. In some embodiments, the back-end interface 150 may be a USB hub. Therefore, the audio conversion device 100 of FIG. 5 may effectively control the audio splitting by use of a transfer module 140, thereby saving the cost. When the software execution unit 192 of the host 190 starts the audio device, the audio conversion device 100 only needs to switch to corresponding endpoint (namely, the first transfer unit 541 or the second transfer unit 542), without changing the audio device (namely, the transfer module 140).

Figure 6:
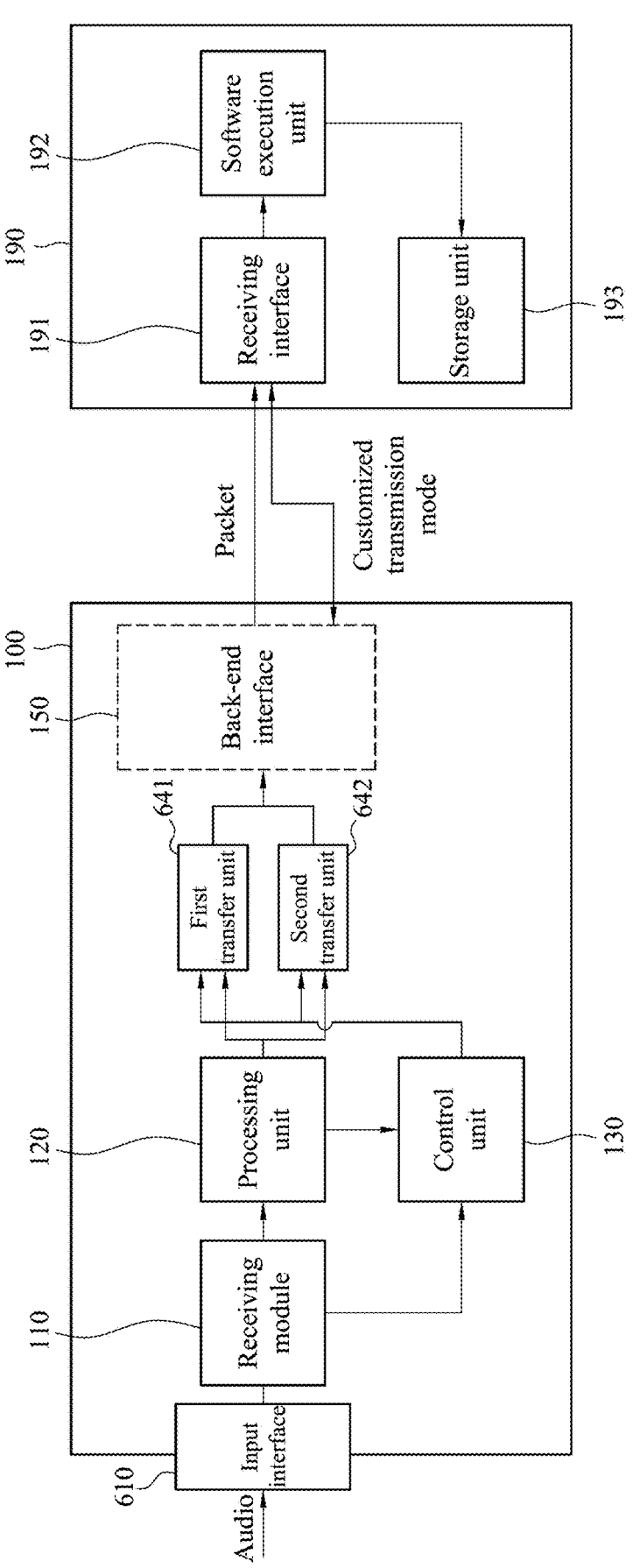
FIG. 6 is a block diagram of an audio conversion device according to some embodiments of the present invention.

FIG. 6 is a block diagram of an audio conversion device 100 according to some embodiments of the present invention. Compared with FIG. 5, the audio conversion device 100 of FIG. 6 includes a first transfer module 641 and a second transfer module 642. In practice, for instance, the first transfer module 641 is a USB bridge, the second transfer module 642 is another USB bridge, and the back-end interface 150 may be a USB hub. Therefore, the audio conversion device 100 of FIG. 6 uses different transfer modules, each for only one purpose, thereby maximizing the audio transmission efficiency. When the software execution unit 192 of the host 190 starts the audio device, since it is switched to a different device (namely, the first transfer module 641 or the second transfer module 642), only one device each time, the bandwidth available is maximized.

Figure 7:
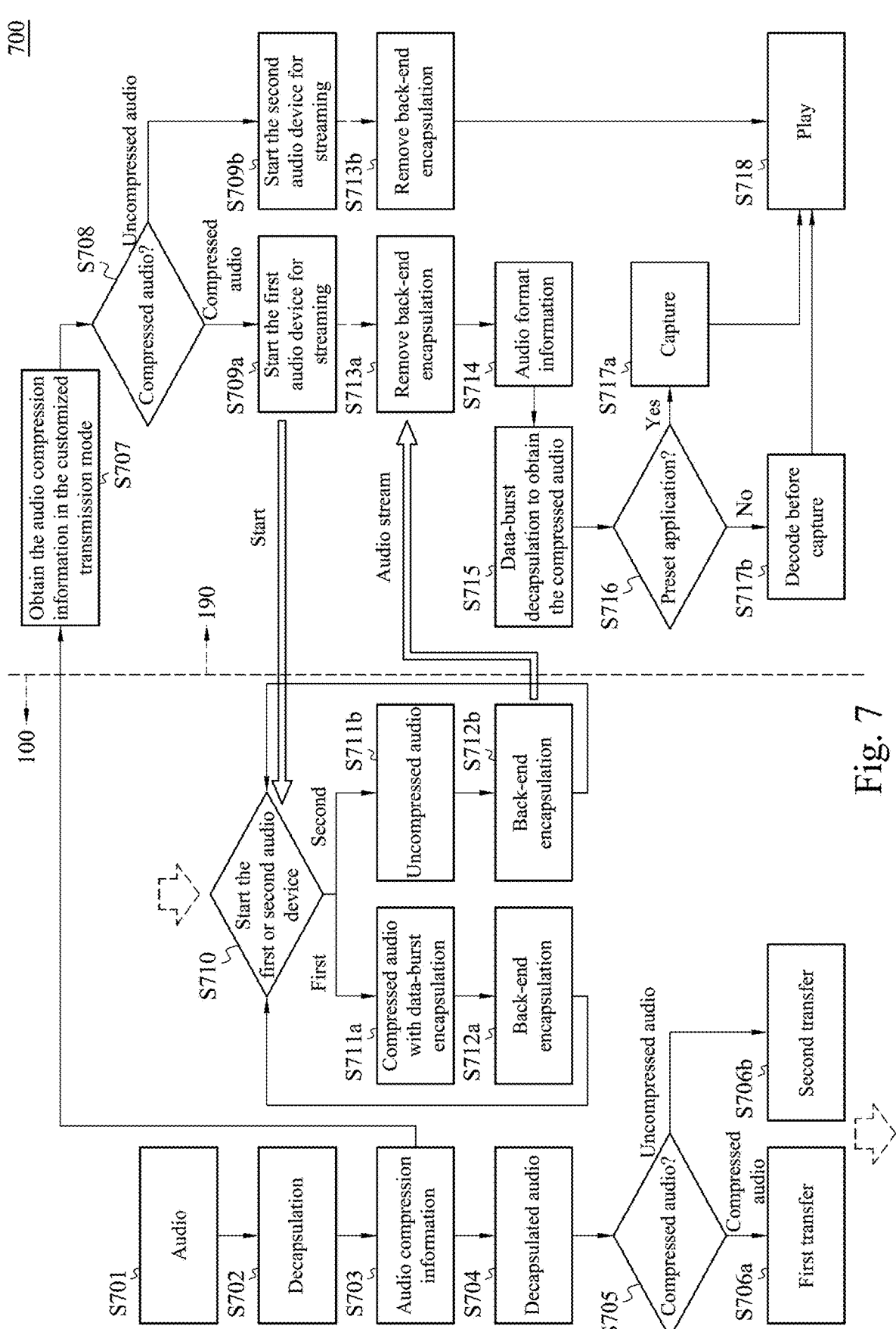
FIG. 7 is a flowchart of an audio conversion method according to some embodiments of the present invention.

To further describe the method of using the audio conversion device 100 of FIGS. 5 and 6 with the host 190, please refer to FIGS. 5-7, where FIG. 7 is a flowchart of an audio conversion method 700 according to some embodiments of the present invention. The audio conversion method 700 of this embodiment may be a method for audio conversion only, or for video/audio conversion, which is not limited here. As shown in FIG. 7, the audio conversion method 700 includes steps S701-S718 (it should be understood that, the steps mentioned in this embodiment, unless with specifically stated order, may all be reordered according to actual needs, or even may be executed simultaneously or partially simultaneously).

In the step S701, a signal source outputs an audio to the input interface 510. In the step S702, the receiving module 110 performs decapsulation in corresponding manner according to different input interfaces to obtain a decapsulated audio, and acquires an audio compression information. For instance, the receiving module 110 may, for example, remove the encapsulation formats such as IEC60958 and IEC61937.

In the step S703, the control unit 130 obtains the audio compression information of the decapsulated audio via the receiving module 110. For instance, the receiving module 110 may obtain the audio compression information via a channel status field of the decapsulated audio. In the step S704, the processing unit 120 obtains the decapsulated audio transferred by the receiving module 110. It should be understood that the steps S703 and S704 may be transposed or implemented simultaneously.

In the step S705, the receiving module 110 determines whether the audio compression information indicates a compressed audio. If the audio compression information indicates a compressed audio, in the step S706a, the control unit 130 informs the transfer module 140 to set the audio data to be transmitted by the first transfer unit 541, and sets that the first transfer unit 541 may use the first transmission mode (e.g., UAC Type I) or the second transmission mode (e.g., UAC Type III); or the control unit 130 informs the first transfer module 641 to set the audio data to be transmitted by a transfer unit (e.g., endpoint) of the first transfer module 641, and sets that the transfer unit of the first transfer module 641 may use the first transmission mode (e.g., UAC Type I) or the second transmission mode (e.g., UAC Type III).

If the audio compression information indicates an uncompressed audio, in the step S706b, the control unit 130 informs the transfer module 140 to set the audio data to be transmitted by the second transfer unit 542, and sets that the second transfer unit 542 may use the first transmission mode (e.g., UAC Type I); or the control unit 130 informs the second transfer module 642 to set the audio data to be transmitted by a transfer unit (e.g., endpoint) of the second transfer module 642, and sets that the transfer unit of the second transfer module 642 may use the first transmission mode (e.g., UAC Type I).

In the step S707, the receiving interface 191 of the host 190 obtains the audio compression information in a customized transmission mode. For instance, the customized transmission mode may be, for example, UVC/UAC extension cmd, human interface device report (HID report), etc.

Then, the host 190 chooses a transmission setting corresponding to the audio conversion device 100 according to the audio compression information, and starts streaming. In the step S708, the software execution unit 192 of the host 190 determines whether the audio compression information indicates a compressed audio. If the audio compression information indicates a compressed audio, in the step S709a, the software execution unit 192 of the host 190 starts a first audio device for streaming, to generate an instruction accordingly. In the step S710, the control unit 130 of the audio conversion device 100 chooses a transmission setting corresponding to the audio conversion device 100 according to the instruction of the host 190, e.g., for determining to start the first audio device (namely, a first transmission setting) or a second audio device (namely, a second transmission setting). If the instruction of the host 190 is to start the first audio device, the control unit 130 sets the step S706a in a way that the first transfer unit 541 or the first transfer module 641 for transmitting a compressed audio is used as the first audio device designated by the host 190; and in the step S711a, the processing unit 120 transfers the compressed audio with data-burst encapsulation to the first transfer unit 541 or the first transfer module 641. In the step S712a, the first transfer unit 541 or the first transfer module 641 performs back-end encapsulation (e.g., USB encapsulation) on the compressed audio with data-burst encapsulation to obtain a back-end encapsulated audio which is transferred to the host 190 via the back-end interface 150 (e.g., USB interface or USB hub).

Then, in the step S713a, the software execution unit 192 of the host 190 receives the back-end encapsulated audio from the first audio device (namely, the first transfer unit 541 or the first transfer module 641), and removes the back-end encapsulation to obtain an audio (e.g., a compressed audio with data-burst encapsulation). In the step S714, the software execution unit 192 of the host 190 parses the audio to obtain an audio format information. In the step S715, the software execution unit 192 of the host 190 decapsulates the audio (e.g., a compressed audio with data-burst encapsulation) in corresponding manner according to the audio format information, to obtain a compressed audio. In the step S716, the software execution unit 192 of the host 190 determines whether other follow-up functional application is a preset application, where the preset application may be an application self-developed by the developer of the audio conversion device 100, and the self-developed application may be compatible with the audio of the audio conversion device 100. If the software execution unit 192 of the host 190 determines that the other follow-up functional application is a preset application, in the step S717a, the preset application may perform capture of the compressed audio according to the audio format information. If the software execution unit 192 of the host 190 determines that the other follow-up functional application is not a preset application, in the step S717b, the software execution unit 192 of the host 190 decodes the compressed audio before capture. In the step S718, the application (e.g., a preset application or non-preset application) executed by the host 190 performs capture, streaming and/or play of the audio.

On the other hand, if the audio compression information indicates an uncompressed audio, in the step S709b, the software execution unit 192 of the host 190 starts the second audio device for streaming, to generate an instruction accordingly. In the step S710, the control unit 130 of the audio conversion device 100 chooses a transmission setting corresponding to the audio conversion device according to the instruction of the host 190, e.g., for determining to start the first audio device (namely, a first transmission setting) or a second audio device (namely, a second transmission setting). If the instruction of the host 190 is to start the second audio device, the control unit 130 sets the step S706b in a way that the second transfer unit 542 or the second transfer module 642 for transmitting an uncompressed audio is used as the second audio device designated by the host 190; and in the step S711b, the processing unit 120 transfers the uncompressed audio to the second transfer unit 542 or the second transfer module 642. In the step S712b, the second transfer unit 542 or the second transfer module 642 performs back-end encapsulation (e.g., USB encapsulation) on the uncompressed audio to obtain a back-end encapsulated audio which is transferred to the host 190 via the back-end interface 150 (e.g., USB interface or USB hub).

Then, in the step S713b, the software execution unit 192 of the host 190 receives the back-end encapsulated audio from the second audio device (namely, the second transfer unit 542 or the second transfer module 642), and removes the back-end encapsulation to obtain an audio (e.g., uncompressed audio). In the step S718, the application executed by the host 190 performs capture, streaming and/or play of the audio.

Figure 8:
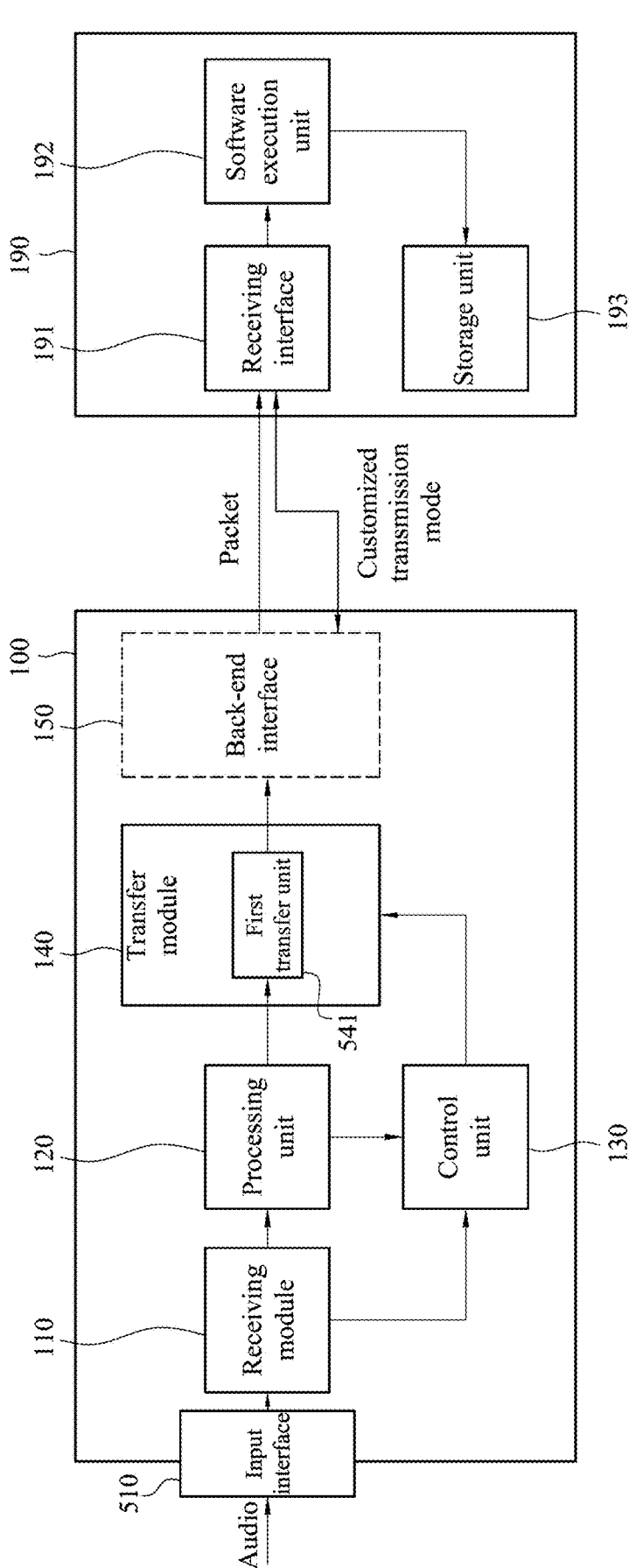
FIG. 8 is a block diagram of an audio conversion device according to some embodiments of the present invention.

FIG. 8 is a block diagram of an audio conversion device 100 according to some embodiments of the present invention. Compared with FIG. 5, the transfer module 140 of FIG. 8 only includes a first transfer unit 541. In practice, for instance, the transfer module 140 is a USB bridge, the first transfer unit 541 is an endpoint of the USB bridge, and the back-end interface 150 may be a USB interface. In some embodiments, the back-end interface 150 may be a USB hub.

Figure 9:
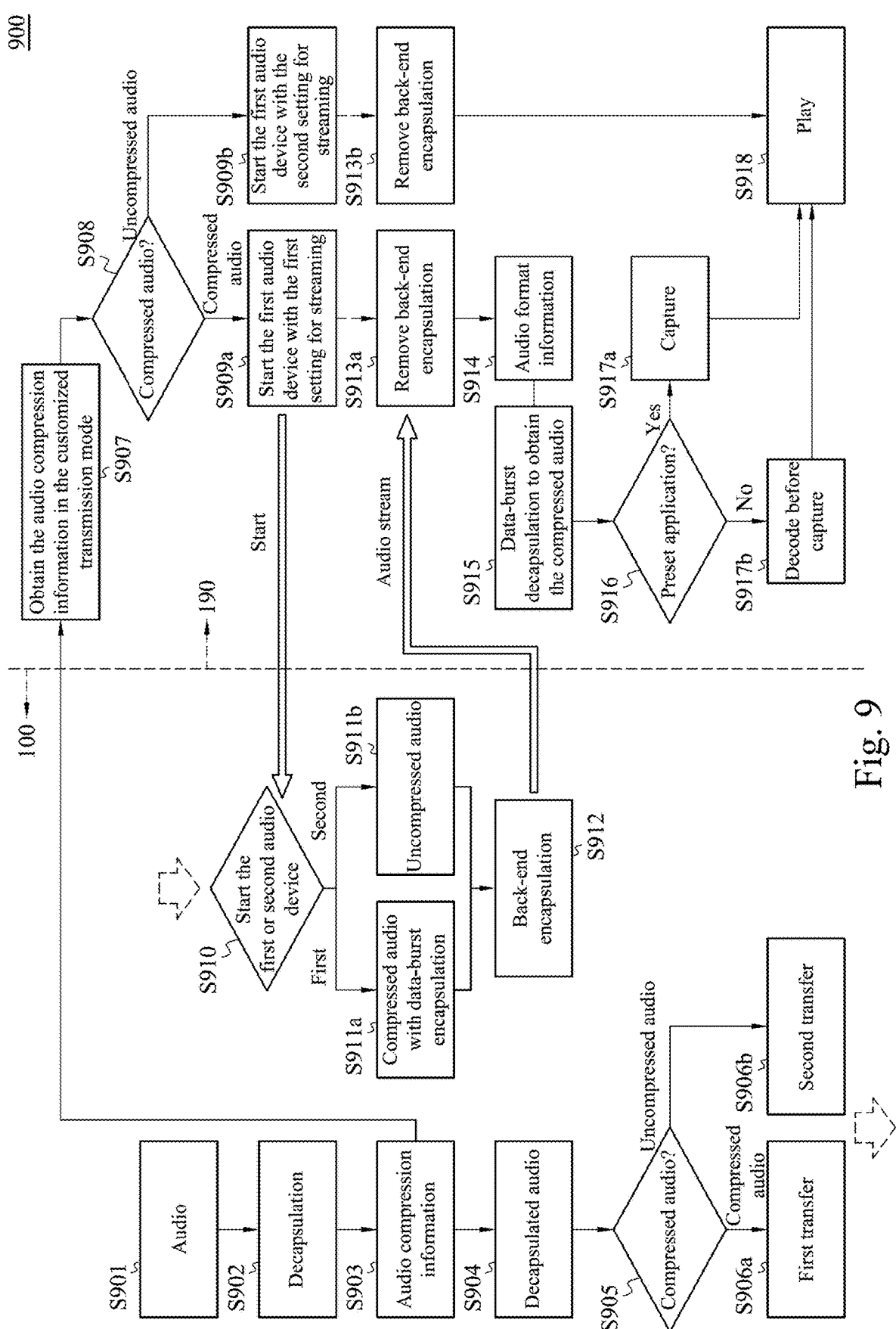
FIG. 9 is a flowchart of an audio conversion method according to some embodiments of the present invention.

To further describe the method of using the audio conversion device 100 of FIG. 8 with the host 190, please refer to FIGS. 8-9, where FIG. 9 is a flowchart of an audio conversion method 900 according to some embodiments of the present invention. The audio conversion method 900 of this embodiment may be a method for audio conversion only, or for video/audio conversion, which is not limited here. As shown in FIG. 9, the audio conversion method 900 includes steps S901-S918 (it should be understood that, the steps mentioned in this embodiment, unless with specifically stated order, may all be reordered according to actual needs, or even may be executed simultaneously or partially simultaneously).

At first, the steps S901-905 are substantially identical to the steps S701-705, which thus are not repeated. If the audio compression information indicates a compressed audio, in the step S906a, the control unit 130 informs the transfer module 140 to set the audio data to be transmitted by the first transfer unit 541 (e.g., endpoint) choosing a first setting, where the first setting may be a first alternate setting, e.g., using a first transmission mode (e.g., UAC Type I) or a second transmission mode (e.g., UAC Type III), and the audio transmission format is a compressed audio.

If the audio compression information indicates an uncompressed audio, in the step S906b, the control unit 130 informs the transfer module 140 to set the audio data to be transmitted by the first transfer unit 541 (e.g., endpoint) choosing a second setting, where the second setting may be a second alternate setting, e.g., using a first transmission mode (e.g., UAC Type I), and the audio transmission format is an uncompressed audio. In some embodiments, a third setting may be included, where the third setting may be a zeroth alternate setting, e.g., for representing a non-use state.

Then, the steps S907-908 are substantially identical to steps S707-708, which thus are not repeated. If the audio compression information indicates a compressed audio, in the step S909a, the software execution unit 192 of the host 190 starts, using the first setting, the first audio device for streaming, to generate an instruction accordingly. In the step S910, the control unit 130 of the audio conversion device 100 chooses a transmission setting corresponding to the audio conversion device according to the instruction of the host 190, e.g., for determining to start the first audio device with the first setting or the second setting. If the instruction of the host 190 is to start the first audio device with the first setting, the control unit 130 sets the step S906a in a way that the first transfer unit 541 for transmitting a compressed audio with the first setting is used as the first audio device designated by the host 190; and in the step S911a, the processing unit 120 transfers the compressed audio with data-burst encapsulation to the first transfer unit 541.

On the other hand, if the instruction of the host 190 is to start the first audio device with the second setting, the processing unit 120 sets the step S906b in a way that the first transfer unit 541 for transmitting a compressed audio with the second setting is used as the first audio device designated by the host 190; and in the step S911b, the processing unit 120 transfers the uncompressed audio to the first transfer unit 541.

Then, in the step S912, the first transfer unit 541 performs back-end encapsulation (e.g., USB encapsulation) on the audio (e.g., uncompressed audio or compressed audio with data-burst encapsulation) to obtain a back-end encapsulated audio which is transferred to the host 190 via the back-end interface 150 (e.g., USB interface or USB hub). After that, the steps S913a-918 are substantially identical to the steps S713a-718, which thus are not repeated.

With the audio conversion method 900, in the transfer module 140 of the audio conversion device 100 of FIG. 8, only one first transfer unit 541 is used for switching the alternate setting, which can be accomplished simply by use of a software. When the software execution unit 192 of the host 190 starts the audio device, the audio conversion device 100 only needs to switch the alternate setting (e.g., the first setting or the second setting of the first transfer unit 541), without changing the audio device or endpoint. For instance, the first alternate setting (e.g., the first setting) of the first transfer unit 541 (endpoint) treats the audio transmission format as a compressed audio, the second alternate setting (e.g., the second setting) of the first transfer unit 541 (endpoint) treats the audio transmission format as an uncompressed audio, and the zeroth alternate setting of the transfer unit 541 (endpoint) is used for representing a non-use state, not for transmission. In a control experiment, the alternate setting of traditional USB only has the zeroth alternate setting for 'transmission' or 'not for transmission', making it impossible to realize diversified use as the embodiments of the present invention.

Figure 10:
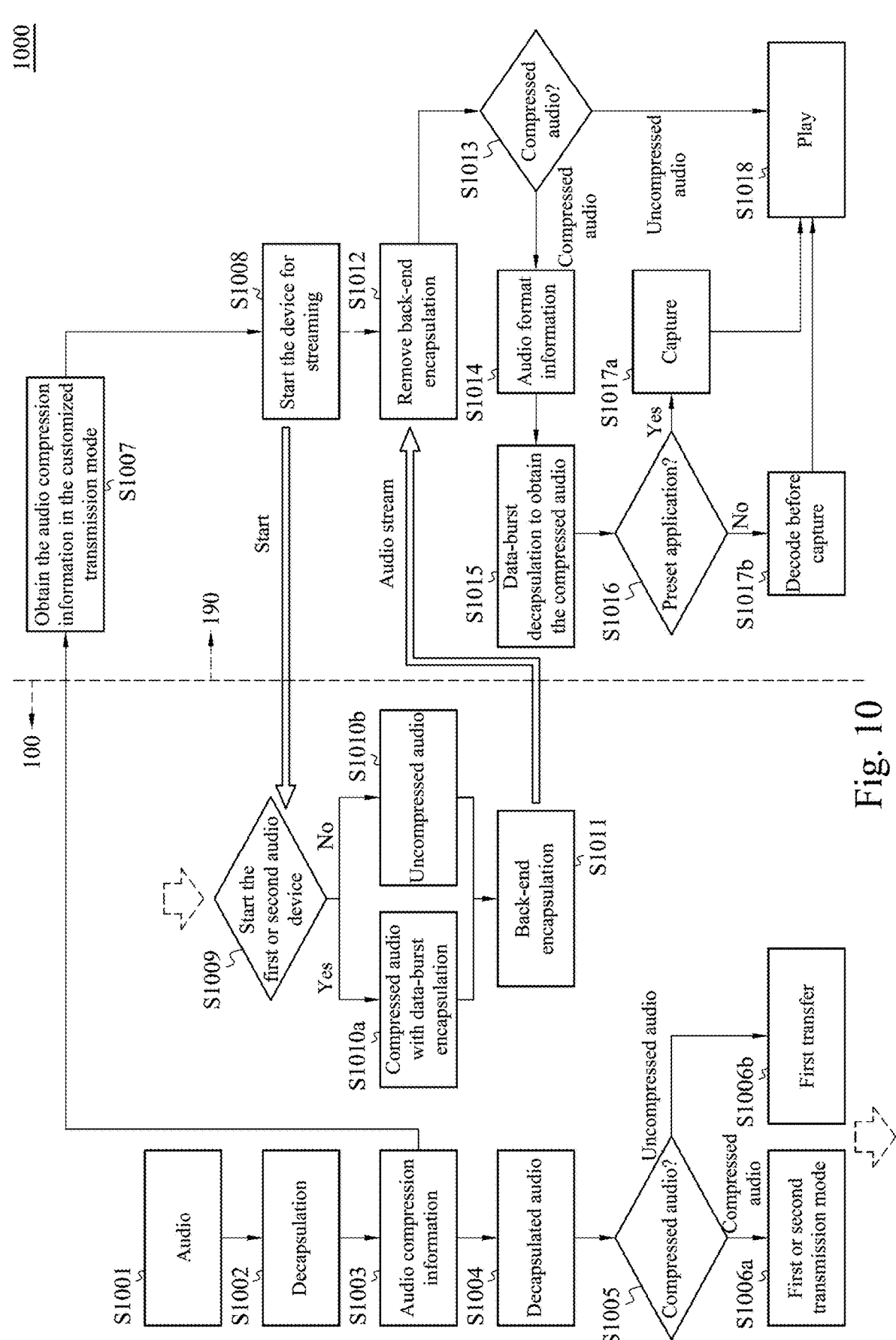
FIG. 10 is a flowchart of an audio conversion method according to some embodiments of the present invention.

To further describe the method of using the audio conversion device 100 of FIG. 8 with the host 190, please refer to FIGS. 8 and 10, where FIG. 10 is a flowchart of an audio conversion method 1000 according to some embodiments of the present invention. The audio conversion method 1000 of this embodiment may be a method for audio conversion only, or for video/audio conversion, which is not limited here. As shown in FIG. 10, the audio conversion method 1000 includes steps S1001-S1018 (it should be understood that, the steps mentioned in this embodiment, unless with specifically stated order, may all be reordered according to actual needs, or even may be executed simultaneously or partially simultaneously).

At first, the steps S1001-1005 are substantially identical to the steps S901-905, which thus are not repeated. If the audio compression information indicates a compressed audio, in the step S1006a, the control unit 130 informs the transfer module 140 to set the audio data to be transmitted by the first transfer unit 541 (e.g., endpoint), where the first transfer unit 541 may use a first transmission mode (e.g., UAC Type I) or a second transmission mode (e.g., UAC Type III).

If the audio compression information indicates an uncompressed audio, in the step S1006b, the control unit 130 informs the transfer module 140 to set the audio data to be transmitted by the first transfer unit 541 (e.g., endpoint), where the first transfer unit 541 may use a first transmission mode (e.g., UAC Type I).

Then, in the step S1007, the receiving interface 191 of the host 190 obtains an audio compression information in a customized transmission mode. No matter what the audio compression information indicates, a compressed audio or an uncompressed audio, in the step S1008, the software execution unit 192 of the host 190 starts the first audio device for streaming, to generate an instruction accordingly. In the step S1009, the control unit 130 of the audio conversion device 100 determines whether it is a compressed audio according to the instruction of the host 190.

If the instruction of the host 190 indicates a compressed audio, the control unit 130 sets the step S1006a in a way that the first transfer unit 541 for transmitting a compressed audio is used for transfer; and in the step S1010a, the processing unit 120 transfers the compressed audio with data-burst encapsulation to the first transfer unit 541.

On the other hand, if the instruction of the host 190 indicates an uncompressed audio, the control unit 130 sets the step S1006b in a way that the first transfer unit 541 for transmitting a compressed audio is used for transfer; and in the step S1010b, the processing unit 120 transfers the uncompressed audio to the first transfer unit 541.

Then, in the step S1011, the first transfer unit 541 performs back-end encapsulation (e.g., USB encapsulation) on the audio (e.g., uncompressed audio or compressed audio with data-burst encapsulation) to obtain a back-end encapsulated audio which is transferred to the host 190 via the back-end interface 150 (e.g., USB interface or USB hub).

Next, in the step S1012, the software execution unit 192 of the host 190 receives the back-end encapsulated audio from the audio conversion device 100, and removes the back-end encapsulation to obtain an audio (e.g., uncompressed audio or compressed audio with data-burst encapsulation). In the step S1013, the software execution unit 192 of the host 190 determines whether the audio is a compressed audio. After that, the steps S1014-1018 are substantially identical to the steps S914-918, which thus are not repeated.

With the audio conversion method 1000, the transfer module 140 of the audio conversion device 100 of FIG. 8 has the simplest functions, which can effectively reduce the device cost. When the software starting unit 192 of the host 190 starts the audio device, the audio conversion device 100 does not need to perform other operations.

Figure 11:
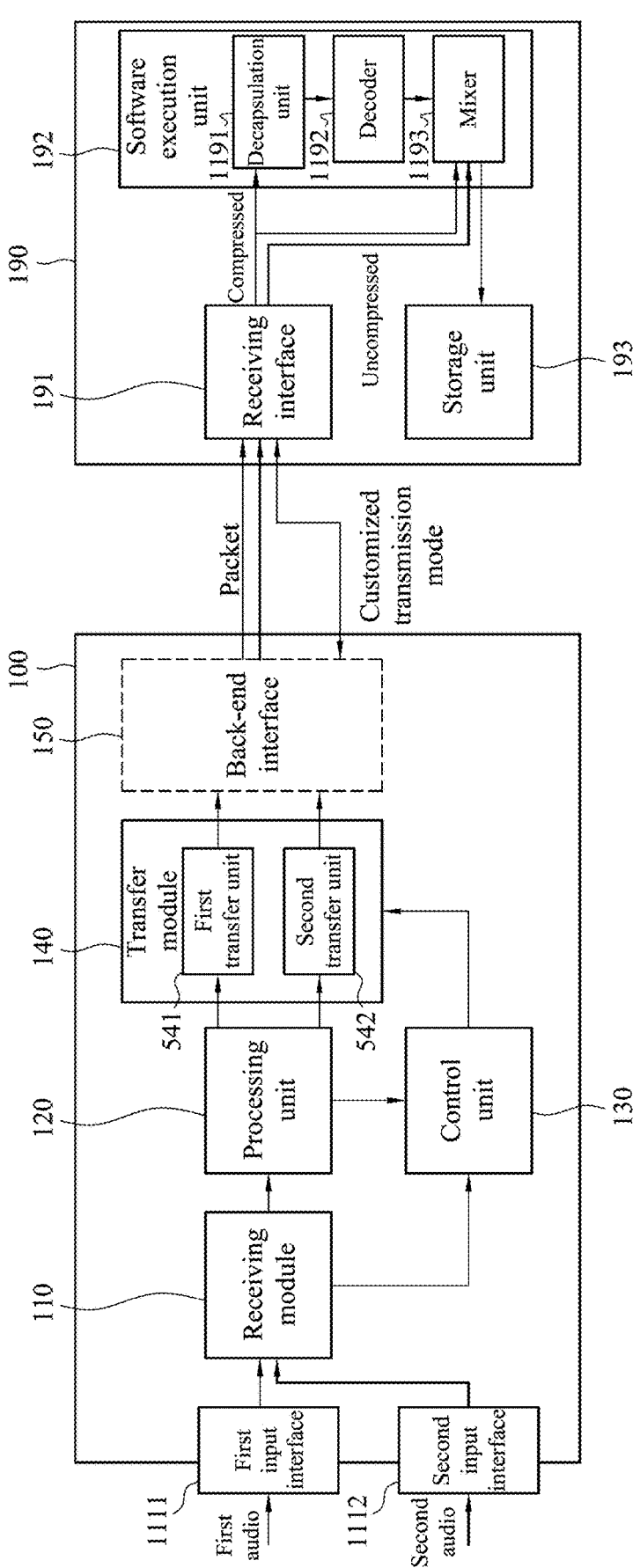
FIG. 11 is a block diagram of an audio conversion device according to some embodiments of the present invention.

FIG. 11 is a block diagram of an audio conversion device 100 according to some embodiments of the present invention. Compared with FIG. 5, the audio conversion device 100 of FIG. 11 includes a first input interface 1111 and a second input interface 1112. In practice, for instance, the first input interface 1111 may be an interface supporting IEC60958 or IEC61937 encapsulation transmission, such as a high-definition multimedia interface (HDMI), a display port (DP) and a SONY/Philips digital interface format (SPDIF), and the second input interface 1112 may be an interface for analog signal input such as Line in and Mic In.

When in use, the first input interface 1111 receives a first audio, and the second input interface 1112 receives a second audio. The control unit 130 determines that the first audio is a compressed audio or an uncompressed audio according to a first audio compression information of the first audio. In addition, since the second input interface 1112 is an analog input interface, the control unit 130 determines that the second audio is an uncompressed audio according to a second audio compression information of the second audio. The audio conversion device 100 may transfer the first audio compression information and the second audio compression information to the host 190 in a customized transmission mode. The control unit 130 informs the transfer module 140 to set the first audio to be transmitted by the first transfer unit 541 (e.g., endpoint), and to set the second audio to be transmitted by the second transfer unit 542 (e.g., endpoint); and the first transfer unit 541 and the second transfer unit 542 are used as two audio devices that can be started by the host 190. The receiving interface 191 of the host 190 starts the two audio devices simultaneously, and receives the packets (e.g., the back-end encapsulated first audio and second audio) of the two audio devices.

If the first audio is a compressed audio, a decapsulation unit 1191 decapsulates the first audio to obtain a decapsulated first audio, a decoder 1192 decodes the decapsulated first audio to obtain a decoded first audio, and a mixer 1193 mixes the decoded first audio with the second audio (uncompressed audio) to obtain a mixed audio.

On the other hand, if the first audio is an uncompressed audio, the mixer 1193 mixes the first audio with the second audio (uncompressed audio) to obtain a mixed audio.

In practice, for instance, the decapsulation unit 1191, the decoder 1192 and the mixer 1193 may be realized by a hardware circuit, or by a hardware circuit executing a software and/or firmware program.

Figure 12:
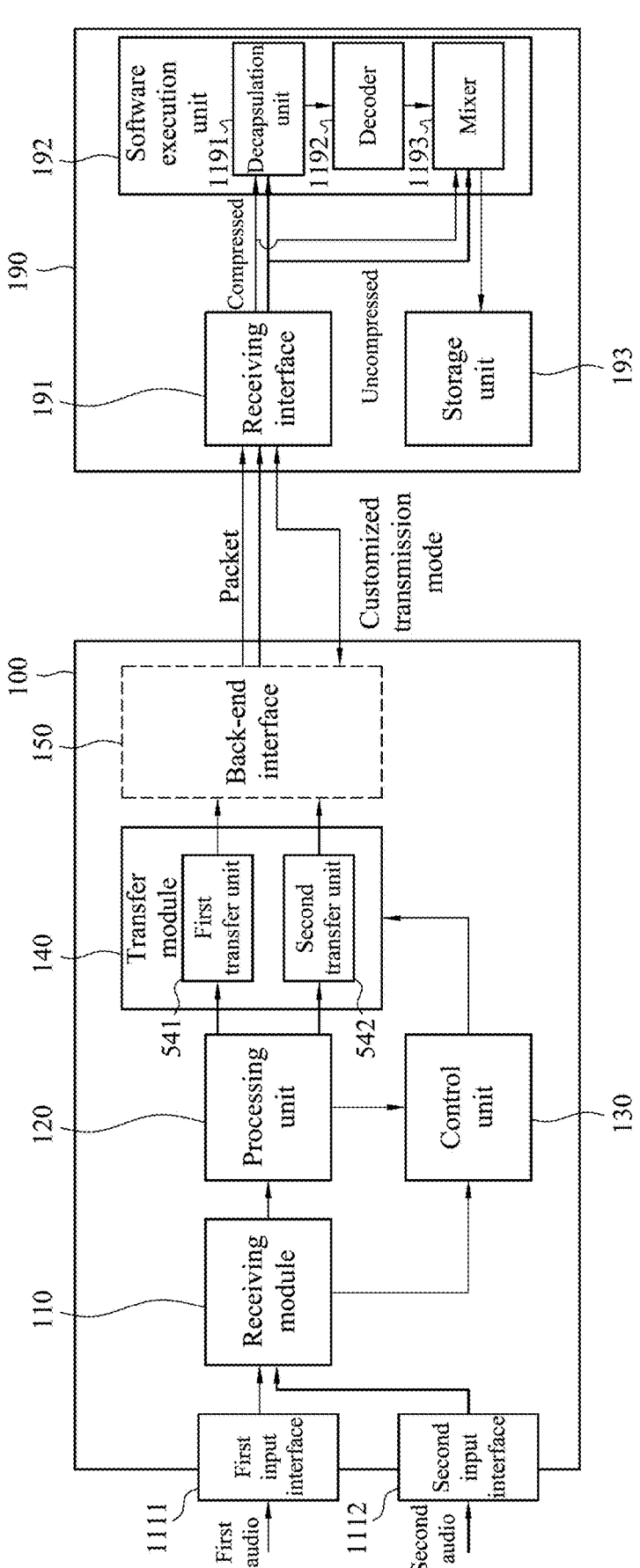
FIG. 12 is a block diagram of an audio conversion device according to some embodiments of the present invention.

FIG. 12 is a block diagram of an audio conversion device 100 according to some embodiments of the present invention. Compared with the second input interface 1112 of FIG.

11, a second input interface 1212 of FIG. 12 may be an interface supporting IEC60958 or IEC61937 encapsulation transmission, such as a high-definition multimedia interface (HDMI), a display port (DP) and a SONY/Philips digital interface format (SPDIF).

If the second audio is a compressed audio, the decapsulation unit 1191 decapsulates the second audio to obtain a decapsulated second audio, the decoder 1192 decodes the decapsulated second audio to obtain a decoded second audio, and the mixer 1193 mixes the decoded second audio with the first audio (the first audio decoded by the decoder 1192 or the uncompressed first audio provided by the receiving interface 191) to obtain a mixed audio.

On the other hand, if the second audio is an uncompressed audio, the mixer 1193 mixes the second audio with the first audio (the first audio decoded by the decoder 1192 or the uncompressed first audio provided by the receiving interface 191) to obtain a mixed audio.

Figure 13:
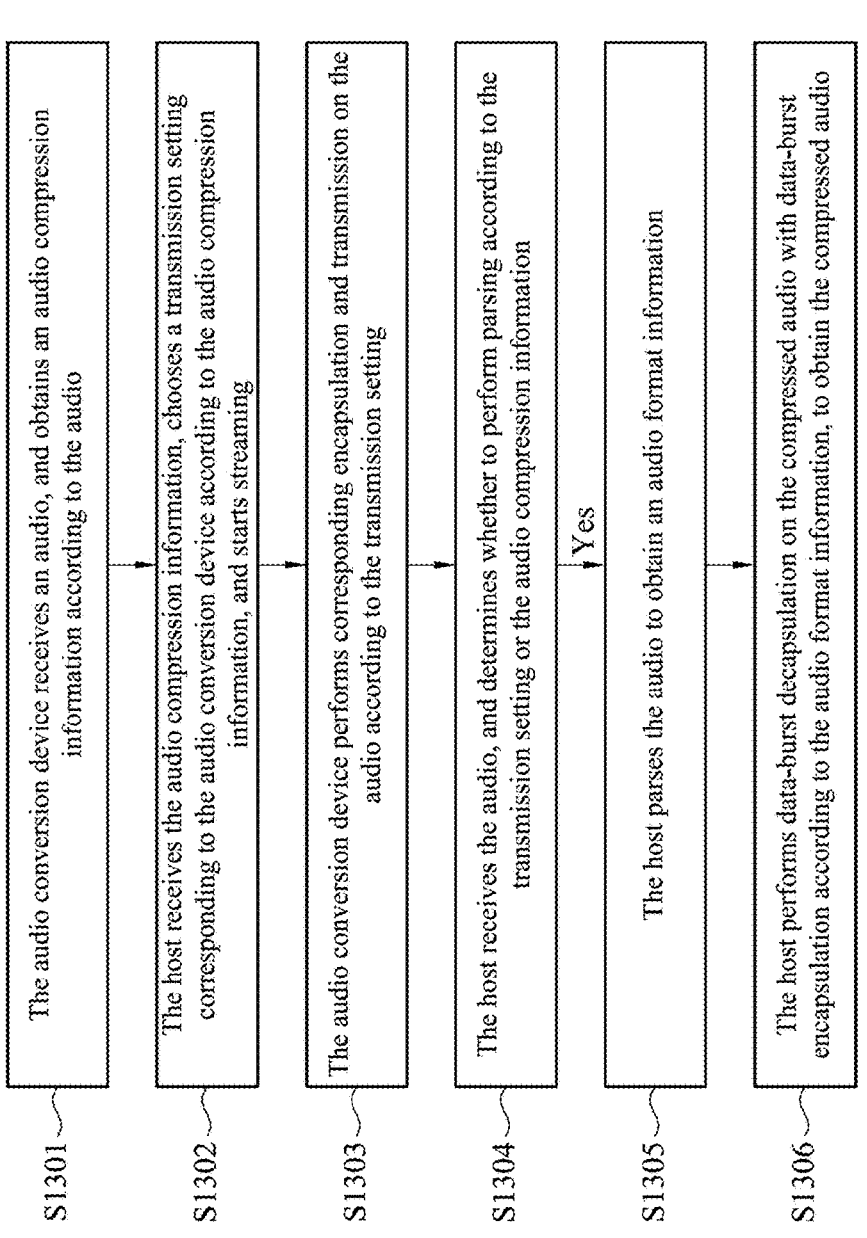
FIG. 13 is a flowchart of an audio conversion method according to some embodiments of the present invention.

To sum up, FIG. 13 is a flowchart of an audio conversion method 1300 according to some embodiments of the present invention. The audio conversion method 1300 of this embodiment may be a method for audio conversion only, or for video/audio conversion, which is not limited here. As shown in FIG. 13, the audio conversion method 1300 includes steps S1301-S1306 (it should be understood that, the steps mentioned in this embodiment, unless with specifically stated order, may all be reordered according to actual needs, or even may be executed simultaneously or partially simultaneously).

Refer to FIGS. 5 and 13, in the step S1301, an audio is received via the audio conversion device 100, and an audio compression information is obtained according to the audio. In the step S1302, the audio compression information is received via the host 190, and a transmission setting corresponding to the audio conversion device 100 is chosen according to the audio compression information, and streaming is started. In the step S1303, corresponding encapsulation and transmission is performed on the audio via the audio conversion device 100 according to the transmission setting. In the step S1304, the audio is received via the host 190, and it is determined whether the audio needs to be parsed according to the transmission setting or the audio compression information. If yes, in the step S1305, the audio is parsed via the host 190 to obtain the audio format information. In the step S1306, it is determined, via the host 190, that the audio is a compressed audio with data-burst encapsulation according to the audio format information, and then data-burst decapsulation is performed on the compressed audio with data-burst encapsulation to obtain the compressed audio.

Refer to FIGS. 5 and 13, in some embodiments of the present invention, in the step S1302, a transmission setting, e.g., a first audio device or a second audio device, corresponding to the audio conversion device, is chosen via the host 190 according to the audio compression information, to generate an instruction accordingly, where if the audio compression information indicates a compressed audio, the host 190 chooses the first audio device; and if the audio compression information indicates an uncompressed audio, the host 190 chooses the second audio device.

Refer to FIGS. 5 and 13, in some embodiments of the present invention, in the step S1303, the instruction of the host 190 is received via the audio conversion device 100, to determine the transmission setting, e.g., starting the first audio device or the second audio device. If the instruction is to start the first audio device, the audio is transmitted by the first transfer unit 541 in the transfer module 140 of the audio conversion device 100; if the instruction is to start the second audio device, the audio is transmitted by the second transfer unit 542 in the transfer module 140 of the audio conversion device 100; and then the first transfer unit 541 or the second transfer unit 542 of the audio conversion device 100 performs back-end encapsulation on the audio for transferring the same to the host 190 via the back-end interface 150.

Refer to FIGS. 6 and 13, in some embodiments of the present invention, in the step S1303, the instruction of the host 190 is received via the audio conversion device 100, to determine the transmission setting, e.g., starting the first audio device or the second audio device. If the instruction is to start the first audio device, the audio is transmitted by the first transfer module 641 of the audio conversion device 100; if the instruction is to start the second audio device, the audio is transmitted by the second transfer module 642 of the audio conversion device 100; and then the first transfer module 641 or the second transfer module 642 of the audio conversion device 100 performs back-end encapsulation on the audio for transferring the same to the host 190 via the back-end interface 150.

Refer to FIGS. 8, 9 and 13, in some embodiments of the present invention, in the step S1302, a transmission setting, e.g., starting the first audio device with a first setting or starting the first audio device with a second setting, corresponding to the audio conversion device 100, is chosen via the host 190 according to the audio compression information, to generate an instruction accordingly. If the audio compression information indicates a compressed audio, the host 190 chooses to start the first audio device with the first setting; and if the audio compression information indicates an uncompressed audio, the host 190 chooses to start the first audio device with the second setting.

Refer to FIGS. 8, 9 and 13, in some embodiments of the present invention, in the step S1303, the instruction of the host 190 is received via the audio conversion device 100, to determine the transmission setting, e.g., starting the first setting or the second setting. If the instruction is to start the first setting, the audio is transmitted by the first transfer unit 541 in the transfer module 140 of the audio conversion device 100 based on the first setting; if the instruction is to start the second setting, the audio is transmitted by the first transfer unit 541 in the transfer module 140 of the audio conversion device 100 based on the second setting; and then the first transfer unit 541 of the audio conversion device 100 performs back-end encapsulation on the audio for transferring the same to the host 190 via the back-end interface 150.

Refer to FIGS. 8, 10 and 13, in some embodiments of the present invention, in the step S1302, no matter what the audio compression information indicates, a compressed audio or an uncompressed audio, an instruction is generated via the host 190 to the audio conversion device 100 for streaming.

Refer to FIGS. 8, 10 and 13, in some embodiments of the present invention, in the step S1303, the instruction of the host 190 is received via the audio conversion device 100, to determine the transmission setting, e.g., transmitting the compressed audio or uncompressed audio. No matter whether the audio is, a compressed audio or an uncompressed audio, the audio is transmitted by the first transfer unit 541 in the transfer module 140 of the audio conversion device 100, and then the first transfer unit 541 of the audio conversion device 100 performs back-end encapsulation on the audio for transferring the same to the host 190 via the back-end interface 150.

Refer to FIGS. 11-13, in some embodiments of the present invention, in the step S1301, a first audio is received via the first input interface 1111 of the audio conversion device 100, and a second audio is received via the second input interface 1112 or the second input interface 1212 of the audio conversion device 100.

Refer to FIGS. 11-13, in some embodiments of the present invention, the audio conversion method 1300 includes: processing the first audio and the second audio and mixing the same. For instance, the above-mentioned processing may be a process of processing the compressed audio and/or uncompressed audio in the software execution unit 192 in FIGS. 11-12, which is not repeated.

To sum up, the technical solution of the present invention has obvious advantages and beneficial effects compared with prior art. By means of the audio conversion methods 200, 300, 400, 700, 900, 1000 and 1300 and the audio conversion device 100 of the present invention, a multi-channel compressed audio is obtained from video/audio capture as the compressed audio with data-burst encapsulation is transmitted, such that a user can authentically record the game or audio-visual experiences.

Although the present invention has been disclosed above in embodiments, the embodiments are not intended to limit the present invention, and any one skilled in the art may make various changes and embellishments without departing from the spirit and scope of the present invention. Therefore, the scope of protection of the present invention shall be defined by the attached claims.

What is claimed is:

1. An audio conversion method, comprising:
   receiving an audio via an audio conversion device, and obtaining an audio compression information according to the audio;
   receiving the audio compression information via a host, choosing a transmission setting corresponding to the audio conversion device according to the audio compression information, and starting streaming;
   performing, via the audio conversion device, corresponding encapsulation and transmission on the audio according to the transmission setting;
   receiving the audio via the host, and determining whether the audio needs to be parsed according to the transmission setting or the audio compression information;
   parsing the audio via the host to obtain an audio format information; and
   determining, via the host, that the audio is a compressed audio with data-burst encapsulation according to the audio format information, and then performing data-burst decapsulation on the compressed audio with data-burst encapsulation to obtain a compressed audio.

2. The audio conversion method of claim 1, wherein choosing the transmission setting corresponding to the audio conversion device according to the audio compression information comprises:
   choosing, via the host, a first audio device or a second audio device according to the audio compression information, to generate an instruction accordingly, wherein if the audio compression information indicates a compressed audio, the host chooses the first audio device; and if the audio compression information indicates an uncompressed audio, the host chooses the second audio device.

3. The audio conversion method of claim 2, wherein performing, via the audio conversion device, corresponding encapsulation and transmission on the audio according to the transmission setting comprises:

receiving, via the audio conversion device, the instruction of the host to determine to start the first audio device or the second audio device, wherein if the instruction is to start the first audio device, the audio is transmitted by a first transfer unit in a transfer module of the audio conversion device; if the instruction is to start the second audio device, the audio is transmitted by a second transfer unit in the transfer module of the audio conversion device; and then the first transfer unit or the second transfer unit of the audio conversion device performs a back-end encapsulation on the audio for transferring the same to the host via a back-end interface.

4. The audio conversion method of claim 2, wherein performing, via the audio conversion device, corresponding encapsulation and transmission on the audio according to the transmission setting comprises:

receiving, via the audio conversion device, the instruction of the host to determine to start the first audio device or the second audio device, wherein if the instruction is to start the first audio device, the audio is transmitted by a first transfer module of the audio conversion device; if the instruction is to start the second audio device, the audio is transmitted by a second transfer module of the audio conversion device; and then the first transfer module or the second transfer module of the audio conversion device performs a back-end encapsulation on the audio for transferring the same to the host via a back-end interface.

5. The audio conversion method of claim 1, wherein choosing the transmission setting corresponding to the audio conversion device according to the audio compression information comprises:

choosing, via the host, to start a first audio device with a first setting or to start the first audio device with a second setting according to the audio compression information, to generate an instruction accordingly, wherein if the audio compression information indicates a compressed audio, the host chooses to start the first audio device with the first setting; and if the audio compression information indicates an uncompressed audio, the host chooses to start the first audio device with the second setting.

6. The audio conversion method of claim 5, wherein performing, via the audio conversion device, corresponding encapsulation and transmission on the audio according to the transmission setting comprises:

receiving, via the audio conversion device, the instruction of the host to determine to start the first setting or the second setting, wherein if the instruction is to start the first setting, the audio is transmitted by a first transfer unit in a transfer module of the audio conversion device based on the first setting; if the instruction is to start the second setting, the audio is transmitted by the first transfer unit in the transfer module of the audio conversion device based on the second setting; and then the first transfer unit of the audio conversion device performs a back-end encapsulation on the audio for transferring the same to the host via a back-end interface.

7. The audio conversion method of claim 1, wherein choosing the transmission setting corresponding to the audio conversion device according to the audio compression information comprises:

generating, via the host, an instruction to the audio conversion device for streaming, no matter what the audio compression information indicates, a compressed audio or an uncompressed audio.

8. The audio conversion method of claim 7, wherein performing, via the audio conversion device, corresponding encapsulation and transmission on the audio according to the transmission setting comprises:

receiving, via the audio conversion device, the instruction of the host to determine to transmit the compressed audio or the uncompressed audio, wherein no matter what the audio is, a compressed audio or an uncompressed audio, the audio is transmitted by a first transfer unit in a transfer module of the audio conversion device, and then the first transfer unit of the audio conversion device performs a back-end encapsulation on the audio for transferring the same to the host via a back-end interface.

9. The audio conversion method of claim 1, wherein receiving the audio via the audio convers ion device comprises:

receiving a first audio via a first input interface of the audio conversion device; and receiving a second audio via a second input interface of the audio conversion device.

10. The audio conversion method of claim 9, wherein receiving the audio via the host comprises:

processing the first audio and the second audio and mixing the same.

11. An audio conversion device, used with a host, the audio conversion device comprising:

at least one input interface, for receiving an audio;

a receiving module, electrically connected to the at least one input interface;

a processing unit, electrically connected to the receiving module, wherein the processing unit obtains an audio compression information according to the audio;

a control unit, electrically connected to the processing unit; and at least one transfer module, electrically connected to the processing unit and the control unit, wherein the control unit controls the at least one transfer module to output the audio compression information to a host such that the host chooses a transmission setting corresponding to the audio conversion device according to the audio compression information, and starts streaming; the control unit controls the at least one transfer module to perform corresponding transmission on the audio according to the transmission setting; and if the host obtains an audio format information by parsing the audio, the host determines that the audio is a compressed audio with data-burst encapsulation according to the audio format information, and then performs data-burst decapsulation on the compressed audio with data-burst encapsulation to obtain a compressed audio.

12. An audio conversion method, comprising:

receiving an audio via an audio conversion device, wherein the audio is a compressed audio;

determining whether to perform a data-burst encapsulation procedure on the compressed audio according to an encapsulation state of the compressed audio;

outputting a compressed audio with data-burst encapsulation after determining whether to perform the data-burst encapsulation procedure on the compressed audio; and receiving the compressed audio with data-burst encapsulation via a host, and performing a data-burst decapsulation procedure on the compressed audio with data-burst encapsulation to obtain the compressed audio.

13. The audio conversion method of claim 12, wherein determining whether to perform the data-burst encapsulation procedure on the compressed audio according to the encapsulation state of the compressed audio comprises:

performing data-burst encapsulation on the compressed audio to generate the compressed audio with data-burst encapsulation, if the encapsulation state of the compressed audio is a state without data-burst encapsulation.

14. The audio conversion method of claim 12, wherein outputting the compressed audio with data-burst encapsulation after determining whether to perform the data-burst encapsulation procedure on the compressed audio comprises:

skipping the data-burst encapsulation procedure for the compressed audio, if the encapsulation state of the compressed audio is a state with data-burst encapsulation.

15. The audio conversion method of claim 12, wherein the host obtains an audio format information of the compressed audio; and receiving the compressed audio with data-burst encapsulation via the host and performing the data-burst decapsulation procedure on the compressed audio with data-burst encapsulation to obtain the compressed audio comprises:

performing the data-burst decapsulation procedure on the compressed audio with data-burst encapsulation according to the audio format information.

16. The audio conversion method of claim 12, further comprising:

using, via the audio conversion device, a first transmission mode or a second transmission mode for the compressed audio, such that the audio conversion device transfers the compressed audio with data-burst encapsulation to the host via the first transmission mode or the second transmission mode.

17. The audio conversion method of claim 16, wherein the host and the audio conversion device are connected via a universal serial bus (USB), the first transmission mode is USB audio class audio data format type I (UAC Type I), and the second transmission mode is USB audio class audio data format type III (UAC Type III).

18. The audio conversion method of claim 12, further comprising:

presetting, via the audio conversion device, the use of a first transmission mode for an uncompressed audio; and presetting, via the audio conversion device, the use of a second transmission mode for the compressed audio.

19. The audio conversion method of claim 18, further comprising:

determining whether the host supports the second transmission mode; and changing the setting via the audio conversion device to preset the use of the first transmission mode for the compressed audio if the host does not support the second transmission mode, such that the audio conversion device transfers the compressed audio with data-burst encapsulation to the host via the first transmission mode, wherein the host and the audio conversion device are connected via a USB, the first transmission mode is UAC Type I, and the second transmission mode is UAC Type III.

20. The audio conversion method of claim 15, wherein the host and the audio conversion device are connected via a universal serial bus (USB), and the host obtains the audio format information in a customized communication manner.

* * * * *